United States Patent
Albertson et al.

(10) Patent No.: US 7,877,706 B2
(45) Date of Patent: Jan. 25, 2011

(54) CONTROLLING A DOCUMENT BASED ON USER BEHAVIORAL SIGNALS DETECTED FROM A 3D CAPTURED IMAGE STREAM

(75) Inventors: Jacob C. Albertson, Newton, MA (US); Kenneth C. Arnold, Ellicott City, MD (US); Steven D. Goldman, Chesterfield, MO (US); Michael A. Paolini, Austin, TX (US); Anthony J. Sessa, Quogue, NY (US)

(73) Assignee: International Business Machines Corporation, Armonk, NY (US)

( * ) Notice: Subject to any disclaimer, the term of this patent is extended or adjusted under 35 U.S.C. 154(b) by 1049 days.

(21) Appl. No.: 11/622,690

(22) Filed: Jan. 12, 2007

(65) Prior Publication Data

US 2008/0170748 A1    Jul. 17, 2008

(51) Int. Cl.
  *G06F 3/00* (2006.01)
(52) U.S. Cl. .................... 715/863; 715/865
(58) Field of Classification Search ............ 715/863, 715/865
  See application file for complete search history.

(56) References Cited

U.S. PATENT DOCUMENTS

| | | |
|---|---|---|
| 5,103,305 A | 4/1992 | Watanabe |
| 5,109,425 A | 4/1992 | Lawton |
| 5,454,043 A | 9/1995 | Freeman |
| 5,502,803 A * | 3/1996 | Yoshida et al. .......... 715/201 |
| 5,581,276 A | 12/1996 | Cipolla et al. |
| 5,691,693 A | 11/1997 | Kithil |
| 5,714,698 A | 2/1998 | Tokioka et al. |
| 5,777,720 A | 7/1998 | Shapiro et al. |
| 5,880,731 A | 3/1999 | Liles et al. |
| 5,930,378 A | 7/1999 | Kubota et al. |

(Continued)

FOREIGN PATENT DOCUMENTS

CN    1655197 A    8/2005

(Continued)

OTHER PUBLICATIONS

"Method for Access Control Via Gesural Verification", IBM Technical Disclosure Bulletin, IBM Corp, New York, US, vol. 36, No. 9B, Sep. 1, 1993, pp. 487-488, 2 pages.

(Continued)

*Primary Examiner*—Dennis Bonshock
(74) *Attorney, Agent, or Firm*—David A. Mims, Jr.; Amy J. Pattillo

(57) ABSTRACT

A computer-implemented method, system, and program product comprises a behavior processing system for capturing a three-dimensional movement of a user within a particular environment, wherein the three-dimensional movement is determined by using at least one image capture device aimed at the user. The behavior processing system identifies a three-dimensional object properties stream using the captured movement. The behavior processing system identifies a particular defined behavior of the user from the three-dimensional object properties stream by comparing the identified three-dimensional object properties stream with multiple behavior definitions each representing a separate behavioral signal for directing control of the document. A document control system selects at least one document element to represent the at least one particular defined behavior and inserts the selected document element into the document.

14 Claims, 8 Drawing Sheets

U.S. PATENT DOCUMENTS

| | | | |
|---|---|---|---|
| 6,002,808 | A | 12/1999 | Freeman |
| 6,049,747 | A | 4/2000 | Nakajima et al. |
| 6,072,494 | A | 6/2000 | Nguyen |
| 6,115,053 | A | 9/2000 | Perlin |
| 6,154,558 | A | 11/2000 | Hsieh |
| 6,181,343 | B1 | 1/2001 | Lyons |
| 6,215,890 | B1 | 4/2001 | Matsuo et al. |
| 6,295,367 | B1 | 9/2001 | Crabtree et al. |
| 6,301,370 | B1 | 10/2001 | Steffens et al. |
| 6,421,453 | B1 | 7/2002 | Kanevsky |
| 6,577,937 | B1 | 6/2003 | Shuman |
| 6,674,877 | B1 | 1/2004 | Jojic et al. |
| 6,766,036 | B1 | 7/2004 | Pryor |
| 6,784,901 | B1 | 8/2004 | Harvey et al. |
| 6,788,809 | B1 | 9/2004 | Grzeszczuk et al. |
| 6,859,144 | B2 | 2/2005 | Newman et al. |
| 7,039,676 | B1 | 5/2006 | Day et al. |
| 7,058,204 | B2 | 6/2006 | MacDougall et al. |
| 7,068,843 | B2 | 6/2006 | Chang et al. |
| 7,224,830 | B2 | 5/2007 | Nefian et al. |
| 7,274,800 | B2 | 9/2007 | Nefian et al. |
| 2002/0004629 | A1 | 1/2002 | Natori |
| 2002/0118880 | A1 | 8/2002 | Liu |
| 2002/0152010 | A1 | 10/2002 | Colmenarez |
| 2003/0058111 | A1 | 3/2003 | Lee et al. |
| 2003/0076300 | A1 | 4/2003 | Lauper |
| 2003/0113018 | A1 | 6/2003 | Nefian |
| 2003/0142068 | A1 | 7/2003 | DeLuca |
| 2003/0156756 | A1 | 8/2003 | Gortuk |
| 2003/0227453 | A1 | 12/2003 | Beier et al. |
| 2004/0032970 | A1 | 2/2004 | Kiraly |
| 2004/0161132 | A1 | 8/2004 | Cohen et al. |
| 2004/0228503 | A1 | 11/2004 | Cutler |
| 2005/0030184 | A1 | 2/2005 | Victor |
| 2005/0069852 | A1 | 3/2005 | Janakiraman et al. |
| 2005/0166163 | A1 | 7/2005 | Chang |
| 2005/0206610 | A1 | 9/2005 | Cordelli |
| 2005/0210419 | A1 | 9/2005 | Kela et al. |
| 2006/0013440 | A1 | 1/2006 | Cohen |
| 2006/0067573 | A1 | 3/2006 | Parr et al. |
| 2006/0097857 | A1 | 5/2006 | Osaka et al. |
| 2006/0098737 | A1 | 5/2006 | Sethuraman et al. |
| 2006/0181518 | A1* | 8/2006 | Shen et al. .................. 345/173 |
| 2006/0181519 | A1* | 8/2006 | Vernier et al. ............... 345/173 |
| 2006/0210112 | A1 | 9/2006 | Cohen et al. |
| 2007/0041058 | A1 | 2/2007 | Disatnik et al. |
| 2007/0063855 | A1 | 3/2007 | Maass |
| 2008/0022365 | A1 | 1/2008 | Chae et al. |
| 2008/0040692 | A1* | 2/2008 | Sunday et al. .............. 715/863 |
| 2008/0068187 | A1 | 3/2008 | Bonefas et al. |
| 2008/0143895 | A1 | 6/2008 | Peterka et al. |
| 2009/0274339 | A9* | 11/2009 | Cohen et al. ................ 382/103 |
| 2010/0169792 | A1 | 7/2010 | Ascar et al. |

FOREIGN PATENT DOCUMENTS

| | | |
|---|---|---|
| EP | 0905644 A | 3/1999 |
| EP | 0991011 A | 4/2000 |
| EP | 1723901 A | 11/2006 |
| EP | 1723901 A1 | 11/2006 |
| FR | 2784887 A | 4/2000 |
| WO | 0002187 A | 1/2000 |
| WO | 2004108466 A | 12/2004 |

OTHER PUBLICATIONS

Black, MJ et al, "Recognizing Temporal Trajectories Using the Condensation Algorithm", Automatic Face and Gesture Recognition, 1998, Proceedings from the Third IEEE International Conference on Nara, Japan, Apr. 1998, Los Alamitos CA, USA, IEEE Comuting Society, pp. 16-21, 6 pages.

Jacob C Albertson et al, "Warning a User About Adverse Behaviors of Others Within an Environment Based on a 3D Captured Image Stream", U.S. Appl. No. 11/622,676, filed Jan. 12, 2007.

Jacob C Albertson et al, "Adjusting a Consumer Experience Based on a 3D Captured Image Stream of a Consumer Response", U.S. Appl. No. 11/622,679, filed Jan. 12, 2007.

Jacob C Albertson et al, "Warning a Vehicle Operator of Unsafe Operation Behavior Based on a 3D Captured Image Stream", U.S. Appl. No. 11/622,684, filed Jan. 12, 2007.

Jacob C Albertson et al, "Tracking a Range of Body Movement Based on 3D Captured Image Streams of a User", U.S. Appl. No. 11/622,685, filed Jan. 12, 2007.

Jacob C Albertson et al, "Controlling Resource Access Based on User Gesturing in a 3D Captured Image Stream of the User", U.S. Appl. No. 11/622,687, filed Jan. 12, 2007.

Jacob C Albertson et al, "Controlling a System Based on User Behavioral Signals Detected from a 3D Captured Image Stream", U.S. Appl. No. 11/622,693, filed Jan. 12, 2007.

Jacob C Albertson et al, "Assisting a Vision-Impaired User with Navigation Based on a 3D Captured Image Stream", U.S. Appl. No. 11/622,696, filed Jan. 12, 2007.

Jacob C Albertson et al, "Informaing a User of Gestures Made by Others Out of the User's Line of Sight", U.S. Appl. No. 11/470,421, filed Sep. 6, 2006.

Alan Yuille, "Computer Vision Systems for the Blind and Visually Disabled", UCLA Dept. Statistics and Psychology, 4 pages, [online], [print accessed on Aug. 18, 2006]. Retrieved from the internet < www.stat.ucla.edu/~yuille/courses/FIAT_Stat19/fiat3.ppt>.

"What is Photosynth", Microsoft Live Labs, copyright Microsoft Corporation 2006, 1 page, [online], [print accessed on Aug. 18, 2006]. Retrieved from the internet <http://labs.live.com/photosynth/whatis/>.

"What is Synthetic Aperture Radar", 3 pages, copyright 2005, Sandia Corporation, [online], [print accessed on Aug. 18, 2006]. Retrieved from the Internet <http://www.sandia.gov/RADAR/whatis.html>.

"Accelerometer", 3 pages, copyright Wikipedia, [online], [print accessed on Oct. 31, 2006], [last modified on Oct. 24, 2006]. Retrieved from the internet <http://en.wikipedia.org/wiki/Accelerometer>.

Eric Lipton, "Faces, Too are Searched as U.S. Airports Try to Spot Terrorists", 1 page, The New York Times, Aug. 17, 2006.

USPTO Office Action, dated Jun. 25, 2009, in RE Albertson (U.S. Appl. No. 11/470,421, filed Sep. 6, 2006), pp. 1-20.

USPTO Notice of Allowance, Dated Dec. 14, 2009, In RE Albertson (U.S. Appl. No. 11/470,421, filed Sep. 6, 2006), pp. 1-13.

USPTO Office Action, Dated Jan. 15, 2010, In RE Albertson (U.S. Appl. No. 11/622,684, filed Jan. 12, 2007), pp. 1-24.

USPTO Office Action, Dated Jan. 14, 2010, In RE Albertson (U.S. Appl. No. 11/622,693, filed Jan. 12, 2007), pp. 1-23.

USPTO Notice of Allowance, Dated Apr. 23, 2010, In RE Albertson (U.S. Appl. No. 11/622,693, filed Jan. 12, 2007), pp. 1-14.

USPTO Notice of Allowance, Dated May 3, 2010, In RE Albertson (U.S. Appl. No. 11/622,684, filed Jan. 12, 2007), pp. 1-37.

USPTO Office Action, Dated Mar. 30, 2010, In RE Albertson (U.S. Appl. No. 11/622,685, filed Jan. 12, 2007, 28 Pages.

Albertson et al, Notice of Allowance, U.S. Appl. No. 11/622,685, filed Jan. 12, 2007, dated Jul. 2, 2010, 13 pages.

Albertson et al, Office Action, U.S. Appl. No. 11/622,687, filed Jan. 12, 2007, dated Aug. 16, 2010, 32 pages.

* cited by examiner

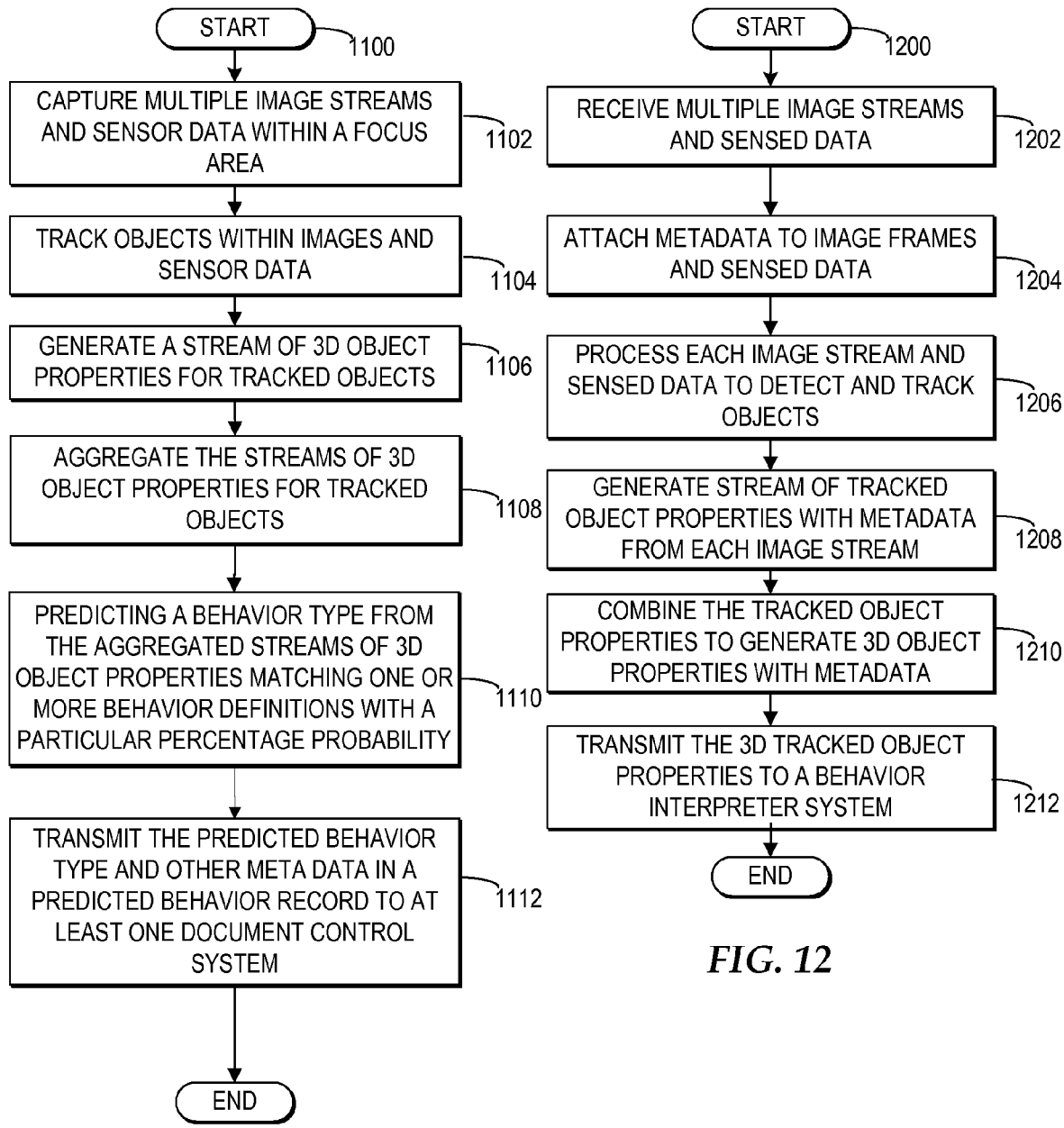

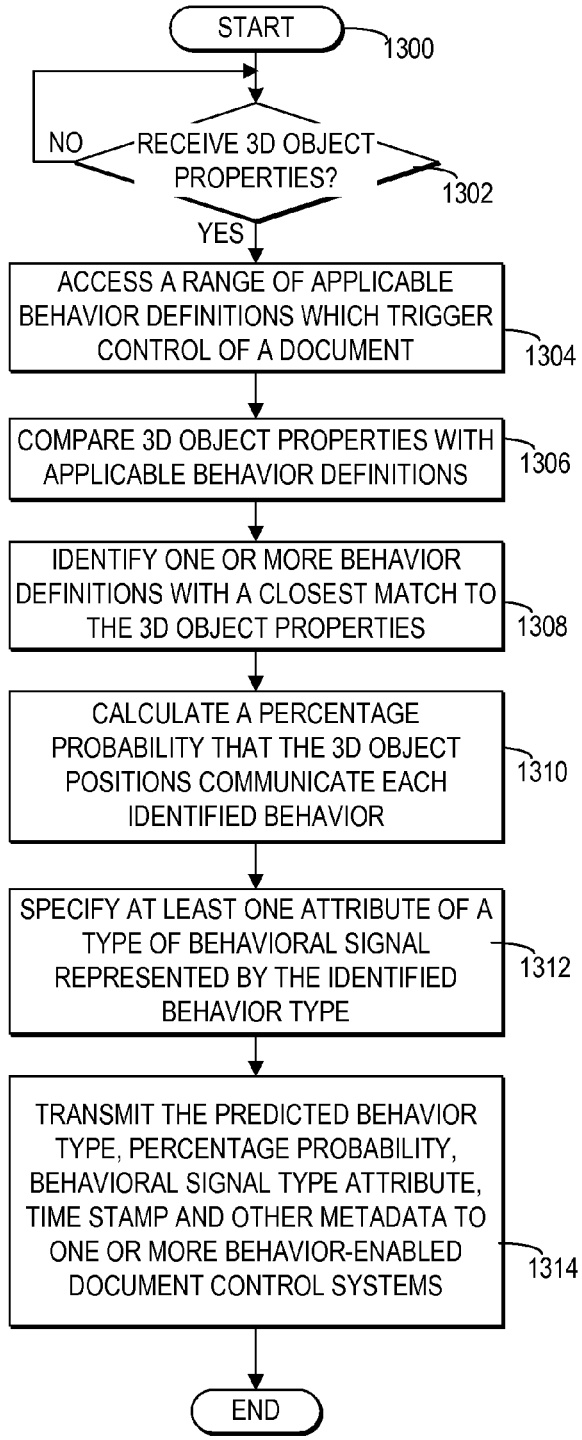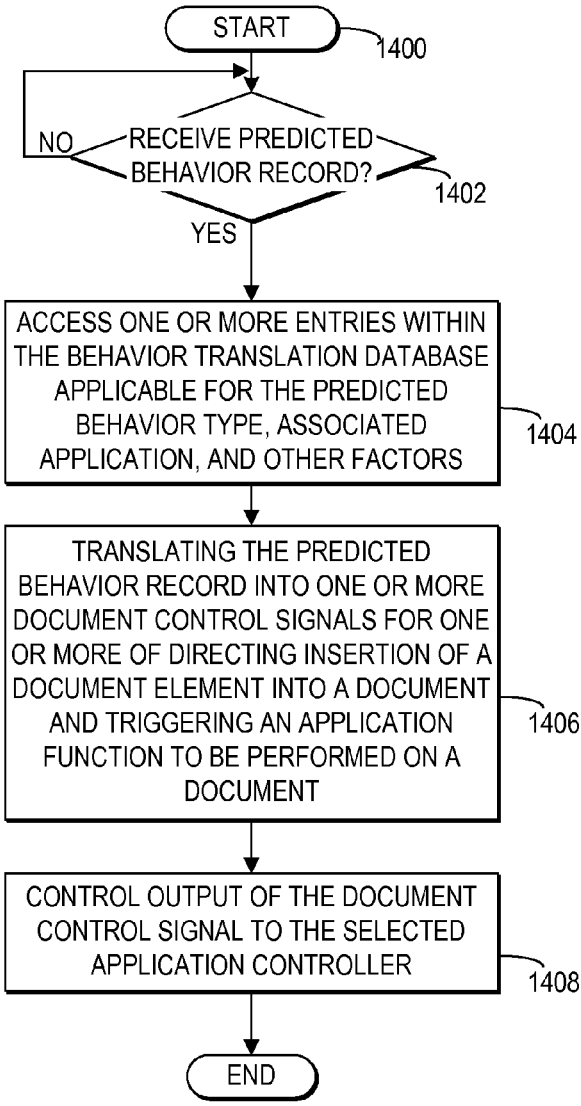
FIG. 13
FIG. 14

US 7,877,706 B2

CONTROLLING A DOCUMENT BASED ON USER BEHAVIORAL SIGNALS DETECTED FROM A 3D CAPTURED IMAGE STREAM

TECHNICAL FIELD

The present invention relates in general to improved automated document creation, transcription, and editing. In particular, the present invention relates to controlling a document based on behaviors of a user, identified from a three-dimensional image stream captured by one or more image capture devices, indicative of behavioral signals which trigger control of the document.

DESCRIPTION OF THE RELATED ART

Many people create, review, and edit multiple documents each day, whether through generating an email document, searching for a web document, creating a document in a word processor, editing a spreadsheet, presenting documents through a document presentation application, or coding an application, for example. Creating, reviewing, and editing multiple types of documents typically requires a user to enter multiple commands by typing on a keyboard, selecting options with a mouse, or speaking commands into a microphone connected to a voice command system.

In creating a document transcribing an event, a person watching the event, such as a court reporter, records a transcript of the event through typing a log representing the person's observations of the words spoken during an event. A person watching the event may observe a behavior of another person and type a reference to the behavior in the log. Voice transcription systems are often used in place of a person, to record a transcript of an event, where the voice transcription system automatically converts detected voice signals into text to generate a transcript of an event. Voice transcription systems are limited, however, in that the behaviors of the speaker are not recorded in the textual transcript. While a video record of an event may be recorded to provide a video record of the behaviors of a speaker, the combination of an automated transcript from voice converted to text and a video record, do not provide a complete textual transcript of both the spoken words and behaviors of speakers and others during an event.

In addition, in creating and editing documents, it is common that a user may be speaking to another person or listening to another person, while creating and editing a document. Thus, while voice commands provide a way for a user to reduce the number of keystrokes or mouse clicks that the user performs in a day, a user who multi-tasks by conversing while editing a document, may not be able to use voice commands to edit a document.

Therefore, in view of the foregoing, there is a need for a method, system, and program for capturing three-dimensional movement of a user, predicting types of behaviors from the captured three-dimensional movement, and selecting whether control a document, including adding an element to a document or performing a function on the document, is triggered based on the identified type of behavior.

SUMMARY OF THE INVENTION

Therefore, the present invention provides improved automated document creation, transcription, and editing. In particular, the present invention provides for controlling a document based on behaviors of a user, identified from a three-dimensional image stream captured by one or more image capture devices, indicative of behavioral signals which trigger control of the document In one embodiment, a computer-implemented method, system, and program product comprises a behavior processing system for capturing a three-dimensional movement of a user within a particular environment, wherein the three-dimensional movement is determined by using at least one image capture device aimed at the user. The behavior processing system identifies a three-dimensional object properties stream using the captured movement. The behavior processing system identifies a particular defined behavior of the user from the three-dimensional object properties stream by comparing the identified three-dimensional object properties stream with multiple behavior definitions each representing a separate behavioral signal for directing control of the document. A document control system selects at least one document element to represent the at least one particular defined behavior and inserts the selected document element into the document.

In capturing a three-dimensional movement of the user, the behavior processing system may capture the three-dimensional movement using a stereoscopic image device to identify and track a particular three-dimensional movement of the user. In addition, in capturing a three-dimensional movement of the user, the behavior processing system may capture at least one image frame of a user at a first point in time and compare at least one additional image frame from a second point in time with the image frame from the first point in time to detect three-dimensional movement.

In selecting at least one document element to represent the at least one particular defined behavior, the document control system selects at least one textual indicator of the at least one particular defined behavior to insert into a transcript recorded in the document at a location specified by a time stamp associated with the captured three-dimensional object properties stream. In addition, in selecting at least one document element to represent the at least one particular defined behavior the document control system may convert the at least one particular defined behavior into a programming code element, equation or module.

In addition, in the embodiment, the document control system selects at least one function to perform on the document to represent at least one particular defined behavior and triggers the application to perform the at least one function on the document. In addition, the document control system may select function to perform on a document and a document element to insert in the document.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 11 is a high level logic flowchart illustrating a process and program for a behavior processing system to predict behavior types with a percentage probability;

FIG. 12 is a high level logic flowchart depicting a process and program for a 3D object detector performing behavior detection by tracking objects within image streams and other sensed data and generating 3D object properties for the tracked objects representative of behaviors;

FIG. 13 is a high level logic flowchart illustrating a process and program for a behavior interpreter system performing behavior prediction from tracked 3D object properties; and FIG. 14 is a high level logic flowchart depicting a process and program for applying a predicted behavior record in a behavior-enabled document control system.

DETAILED DESCRIPTION OF THE PREFERRED EMBODIMENT

Figure 1:
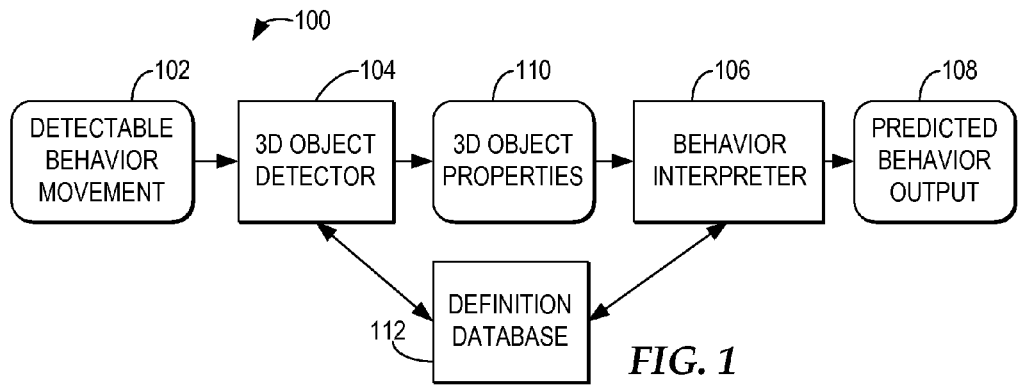
FIG. 1 is a block diagram illustrating a flow of information in a behavior processing method, system, and program product.

With reference now to FIG. 1, a block diagram illustrates a flow of information in a behavior processing method, system, and program product. It will be understood that FIG. 1 provides one embodiment of information flow for capturing image streams of one or more users and processing those image streams to predict behaviors of users and to predict which behaviors represent behavioral signals which trigger control of a document, however, other information flows may be implemented to process captured data and predict behaviors and whether the behaviors represent behavioral signals for trigger control of a document.

It is important to note that as used throughout, the term "behavior" may include user actions typically labeled as behavior or body language, such as gesturing and facial expressions, and may also include, but is not limited to, any detectable body movements, detectable body posture, detectable eye movements, changes in skin surface characteristics such as color, temperature, tone, and level of perspiration, changes in muscle contraction, and other types of non-verbal communication. The term "document" as used throughout, may include, but is not limited to, a computer file with at least one text or graphical element created with an application or a computer file that contains data for use by an application. Examples of documents may include, but are not limited to, a word processor file, an email, a web page, a code module, and a graphical file.

In the example, a behavior processing system 100 includes a three-dimensional (3D) object detector 104. 3D object detector 104 represents multiple systems for capturing images and other data about moving and stationary objects, streamlining the captured data, tracking particular objects within the captured movement, streaming the properties of the particular objects, and combining the streamed properties into a three-dimensional representation of the 3D characteristics of the captured objects, as illustrated by 3D object properties 110. 3D object properties 110 may include, but are not limited to, positions, color, size, and orientation, representative of movement by users within an environment, objects within an environment, and the background identifying attributes of an environment, for example.

In the example, 3D object detector 104 captures images within a focus area, represented as detectable behavior movement 102. In addition, 3D object detector 104 may detect other types of data within a focus area. In particular, 3D object detector 104 detects detectable behavior movement 102 through multiple types of image and data detection including, but not limited to, capturing video images, detecting body part movement, detecting skin texture, detecting eye movement, detecting skin surface characteristics, and capturing thermal images. For supporting multiple types of image and data detection, 3D object detector 104 may include multiple types of image capture devices, including one or more video cameras arranged for stereoscope video image capture, and other types of sensors for capturing at least one other characteristic of one or more objects, such as thermal body imaging sensors, skin texture sensors, laser sensing devices, sound navigation and ranging (SONAR) devices, or synthetic laser or sonar systems. In particular, a sensor may be implemented using a separate sensor unit or may be implemented through a logic unit that operates on a captured image stream. For example, a logic unit may process the captured image stream to detect facial skin textures distinguishable from non-skin textures, such as a smooth wall or textured foliage, within a focus area.

Portions of detectable behavior movement 102 may include images and other data representative of actual behaviors and other portions of detectable behavior movement 102 may include images and data not representative of behaviors. Some behaviors within detectable behavior movement 102 may represent behavioral signals which trigger control of a document.

3D object detector 104 translates detectable behavior movement 102 into a stream of 3D properties of detected objects and passes the stream of 3D object properties 110 to behavior interpreter 106. Behavior interpreter 106 maps the streamed 3D object properties 110 into one or more behaviors for each detected user and estimates, for each predicted behavior of a detected user, the probability that the actual behavior in detectable behavior movement 102 is correctly predicted by behavior interpreter 106. In addition, behavior interpreter 106 predicts whether a particular predicted behavior represents a behavioral signal which triggers control of a document.

Behavior interpreter 106 outputs each predicted behavior, percentage probability, and whether the predicted behavior represents a behavioral signal which triggers control of a document as predicted behavior output 108. Behavior interpreter 106 may pass predicted behavior output 108 to one or more behavior-enabled applications at one or more systems.

In particular, in processing detectable behavior movement 102 and generating predicted behavior output 108, 3D object detector 104 and behavior interpreter 106 may access a definition database 112 of previously accumulated and stored behavior definitions to better track and detect, within 3D object properties 110, those monitored objects representative of behaviors, to better recognize people separate from other objects within detectable behavior movement 102, and to better track, recognize, and predict behaviors representative of behavioral signals which triggers control of a document from 3D object properties 110.

Further, in processing behavior movement 102 and generating predicted behavior output 108, 3D object detector 104 and behavior interpreter 106 attempt to identify objects representative of user behaviors and predict the type of behavior in view of the overall interaction in which the behavior is made. Thus, 3D object detector 104 and behavior interpreter 106 attempt to determine not just a behavior, but a level of emphasis included in a behavior that would effect the meaning of the behavior, a background of a detected user making a behavior that would effect the meaning of the behavior, the environment in which the detected user makes the behavior that would effect the meaning of the behavior, combinations of behaviors made together that effect the meaning of each behavior and other detectable factors that effect the meaning of a behavior. In addition, 3D object detector 104 and behavior interpreter 106 determine whether a particular user is the user whose behavior should trigger control of a document. Thus, definition database 112 includes behaviors definitions corresponding to different types of people, environments, and other factors that may affect the meaning of a behavior. In addition, definition database 112 includes behavior definitions adjusted according to a corresponding facial expression or other corresponding behavior. Further, definition database 112 may be trained to more accurately identify objects representing particular people, animals, places, or things.

In addition, in generating predicted behavior output 108, behavior interpreter 106 identifies behaviors and identifies the time range over which a behavior occurs or the speed or intensity at which a behavior occurs. In one example, where the predicted behavior triggers control of a document, the predicted behavior triggers editing a document to include a textual indicator of the behavior, such that factors such as the speed of intensity of movement effect the level of detail in the textual indicator. In another example, where the predicted behavior triggers control of a document, the predicted behavior triggers a function of an application to be performed on the document, such that factors such as the speed and intensity of movement effect which function of the application may be triggered by the predicted behavior.

Further, in processing behavior movement 102, multiple separate systems of image capture devices and other sensors may each capture image and data about separate or overlapping focus areas from different angles. The separate systems of image capture devices and other sensors may be communicatively connected via a wireless or wired connection and may share captured images and data with one another, between 3D behavior detectors or between behavior interpreters, such that with the combination of data, behavior interpreter 106 may interpreter behaviors with greater accuracy.

Figure 2:
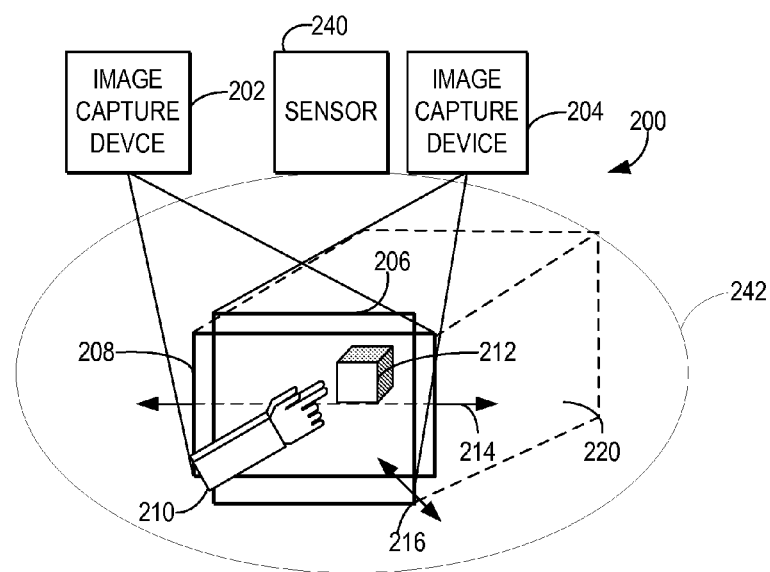
FIG. 2 is an illustrative block diagram depicting an example of an environment in which a 3D object detector captures and generates the 3D object properties representative of captured behavior movement.

Referring now to FIG. 2, an illustrative diagram depicts an example of an environment in which a 3D object detector captures and generates the 3D object properties representative of captured behavior movement. It will be understood that detectable movement environment 200 is one example of an environment in which 3D object detector 104 detects images and data representative of detectable behavior movement 102, as described with reference to behavior processing system 100 in FIG. 1.

In the example, detectable movement environment 200 includes a stereoscopic image device comprising an image capture device 202 and an image capture device 204, each positioned to detect movement of one or more objects, including people, within a combined 3D focus area 220. In the depicted embodiment, image capture device 202 and image capture device 204 may each be positioned on one stationary axis or separate stationary axis, such that the area represented by 3D focus area 220 remains constantly focused upon. In addition, in the depicted embodiment, image capture device 202 and image capture device 204 and any other sensors may be positioned in parallel, at tangents, or at any other angles to control the span of and capture images within 3D focus area 220.

In another embodiment, image capture device 202 and image capture device 204 may each be positioned on a position adjustable axis or the actual focus point of image capture device 202 and image capture device 204 may be adjustable, such that the area represented by 3D focus area 220 may be repositioned. In one example, each of image capture device 202 and image capture device 204 may be coupled with one or more thermal imaging devices that detect thermal imaging based movement within a broad area and directs the repositioning of the focus area of each of image capture device 202 and image capture device 204 to track the thermal movement within the focus area of each camera.

Further, in the present embodiment, image capture device 202 and image capture device 204 may be affixed to an apparatus that is carried by or worn by a person. For example, image capture device 202 and image capture device 204 may be affixed to a pair of glasses or other headwear for a person, such that 3D focus area 220 changes as the person moves. In another example, image capture device 202 and image capture device 204 may be affixed to a moving machine, such as a vehicle, such that 3D focus area 220 changes as the vehicle moves.

Although not depicted, in another embodiment, only a single video camera, such as image capture device 202, may be implemented as a stereoscopic image device. The single video camera is placed on a track or other adjustable axis and a controller adjusts the position of the single video camera along the track, wherein the single video camera then captures a stream of video images within a focus area at different positioned points along the track and 3D behavior detector 104 combines the stream of images into a 3D object property stream of the properties of detectable objects. In one example, the 3D object property stream can be generated from comparing the changes in luminance and shadowing across the frames as the camera changes in position. Alternatively, a stereoscopic image device may be implemented using a single fixed camera coupled with a sensor that detects depth. In addition, alternatively, a single camera enabled to process images and detect depth from a fixed position may function as a stereoscopic image device. For example, the single camera may process images and detect depth from detecting the movement of a light source and comparing changes in luminance and shadowing across the captured image frames. In particular, the single camera system may first map a model of a person's face, focusing on the eyes, mouth, and nose and then detect changes in luminance and shadowing across image frames to detect depth characteristics of the face. In other examples, a system may process a captured stream of video images to extract depth from other characteristics of the stream of images.

For purposes of example, 3D focus area 220 includes a first capture plane 206, captured by image capture device 202 and a second capture plane 208, captured by image capture device 204. First capture plane 206 detects movement within the plane illustrated by reference numeral 214 and second capture plane 208 detects movement within the plane illustrated by reference numeral 216. Thus, for example, image capture device 202 detects movement of an object side to side or up and down and image capture device 204 detects movement of an object forward and backward within 3D focus area 220. It is important to note that when the movement of an object is tracked at a fine granularity, even small adjustments in the body movement such as a raised eyebrow, a constricted muscle, or a finger bending, of a person are tracked and can then be interpreted as behavior representing a behavioral signal which triggers control of a document.

In the example, within 3D focus area 220, a hand 210 represents a moving object and a box 212 represents a stationary object. In the example, hand 210 is the portion of a person's hand within 3D focus area 220. A monitored person may make any number of movements, some representative of behavioral signals which trigger control of a document, by moving hand 210.

As a person moves hand 210 within 3D focus area 220, each of image capture device 202 and image capture device 204 capture a video stream of the movement of hand 210 within capture plane 206 and capture plane 208. From the video streams, 3D object detector 104 detects hand 210 as a moving object within 3D focus area 220 and generates a 3D property stream, representative of 3D object properties 110, of hand 210 over a period of time.

In addition, a person may move hand 210 in relation to box 212 or another object. For example, a person may point or make another type of behavior directed to box 212. As the person moves hand 210 within 3D focus area 220, the video streams captured by image capture device 202 and image capture device 204 include the movement of hand 210 and box 212. From the video streams, 3D object detector 104 detects hand 210 as a moving object and box 212 as a stationary object within 3D focus area 220 and generates 3D object property streams indicating the 3D properties of box 212 and the 3D properties of hand 210 in relation to box 212 over a period of time.

It is important to note that by capturing different planes of movement within 3D focus area 220 using multiple cameras, more points of movement are captured than would occur with a typical stationary single camera. By capturing more points of movement from more than one angle, 3D object detector 104 can more accurately detect and define a 3D representation of stationary objects and moving objects, including behaviors, within 3D focus area 220. In addition, the more accurately that 3D object detector 104 defines a 3D representation of a moving object, the more accurately behavior interpreter 106 can predict a behavior from the 3D model. For example, a behavior could consist of a user making a motion directly towards or away from one of image capture device 202 and image capture device 204 which would not be able to be captured in a two dimensional frame; 3D behavior detector 104 detects and defines a 3D representation of the behavior as a moving object and behavior interpreter 106 predicts the behavior made by the movement towards or away from a video camera from the 3D model of the movement. Further, by capturing more points in different planes of movement within 3D focus area 220, the processing load required to generate 3D object properties 110 is reduced in comparison to the processing load needed to generate 3D object properties 110 from points gathered from only a single 2D plane of movement.

In addition, it is important to note that while FIG. 2 illustrates a gesturing hand 210 and a stationary box 212, in alternate embodiments, 3D focus area 220 may include multiple separate monitored users and other elements, such that image capture device 202 and image capture device 204 capture images of the behavior of multiple people and images of behavior of multiple people in relation to each other or one or more elements, and 3D object detector 104 detects each behavior by each person as a separate object. In particular, 3D object detector 104 may detect, from the captured video images from image capture device 202 and image capture device 204, behaviors with more motion, such as behaviors made with hands, and behaviors made with less motion, such as facial expressions, to accurately generate 3D object properties of a person's non-verbal communication.

In the example, in addition to capturing images within focus area 220, within detectable movement environment 200, other sensors may detect information relevant to an environment, but outside of focus area 220. For example, sensor 240 may detect information within a sensor area 242. Sensor area 242 may overlap, be incorporated within, incorporate, or be separate from focus area 220. 3D object detector 104 combines the sensed information with captured images to more accurately generate 3D object properties 110 and to provide additional information about an environment to a document control system.

In one example, sensor 240 may perform facial recognition or other identification recognition from the captured image streams. In one example, sensor 240 may access a database of facial mappings for users and identify a particular user facial mapping matching a particular facial mapping from the database. In another example, sensor 240 may analyze the captured image stream for text that may identify a user. For example, sensor 240 may detect a badge number the captured image stream of a badge worn by a user. By sensor 240 detecting a user identity, object detector 104 may more accurately generate 3D object properties and movement interpreter 106 may more accurately predict types of user behavioral movement from definitions specified for the identified user in definition database 112.

Additionally, in another example, sensor 240 may supplement user and other object recognition by detecting information broadcast from RFID chips placed on objects within sensor area 242, where the RFID of an object broadcasts the object type, the object location, and any warning conditions associated with the object. In on example, a portable telephone carried by a user, an identification card carried by a user or other item carried by a user may include an RFID chip that broadcasts one or more of an identifier for the user and an identifier for the item. By combining sensed information about the location of a particular object with captured images from which the image is identified, object detector 104 may more accurately generate 3D object properties 110 and behavior interpreter 106 may more accurately predict the types of 3D objects, the user associated with 3D objects, the behaviors representing behavioral signals which trigger control of a document detected within 3D object properties 110.

In another example, sensor 240 may track the relative location of a tracked object within sensor area 242. Although not depicted, sensor area 242 may track a person move from a first focus area 220 to a second focus area within sensor area 242. By tracking movement across multiple focus areas, sensor 240 provides additional tracking information of a location of a monitored person so that data gathered in different focus areas can be shared when generating 3D object properties 110.

Figure 3:
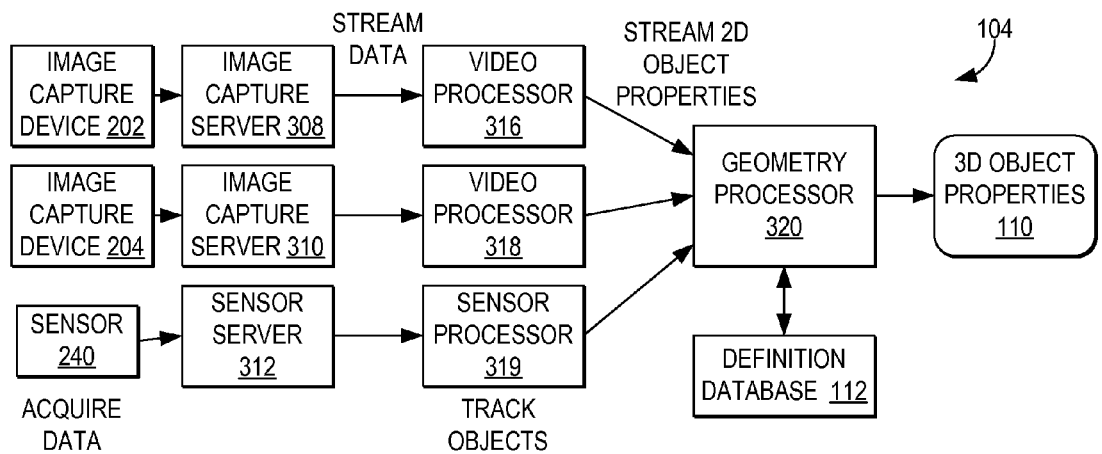
FIG. 3 is a block diagram illustrating one embodiment of a 3D object detector system for generating 3D object properties for enabling a behavior interpreter to interpret, from 3D object properties, behaviors of monitored users and whether these behaviors represent behavioral signals which trigger control of a document.

In yet another example, sensor 240 may detect additional information about the depth, surface area, color temperature or other characteristic of an object to more accurately predict whether the object is representative of a particular behavior and whether that represents a behavioral signal which triggers control of a document. In particular, by detecting additional information about the depth, surface area, or other characteristic of an object, data collected by sensor 240 is combined with images captured by image capture device 202 and image capture device 204 to generate additional detail and granularity in a 3D image of an object representing user movement With reference now to FIG. 3, a block diagram illustrates one embodiment of a 3D object detector system for generating 3D object properties for enabling a behavior interpreter to interpret, from 3D object properties, behaviors of monitored users and whether these behaviors represent behavioral signals which trigger control of a document. It is important to note that the multiple components depicted within 3D object detector 104 may be incorporated within a single system or distributed via a network, other communication medium, or other transport medium across multiple systems. In addition, it is important to note that additional or alternate components from those illustrated may be implemented in 3D object detector 104 for capturing images and data and generating a stream of 3D object positions 110.

Initially, multiple image capture devices, such as image capture device 202, image capture device 204 and sensor 240, represent a stereoscopic image device for acquiring the data representative of detectable movement 102 within a 3D focus area and sensor area, such as 3D focus area 220 and sensor area 242. As previously described, image capture device 202 and image capture device 204 may represent video cameras for capturing video images. In addition, image capture device 202 and image capture device 204 may represent a camera or other still image capture device. In addition, image capture device 202 and image capture device 204 may represent other types of devices capable of capturing data representative of detectable behavior movement 102. Image capture device 202 and image capture device 204 may be implemented using the same type of image capture system or different types of image capture systems. In addition, the scope, size, and location of the capture area and plane captured by each of image capture device 202 and image capture device 204 may vary.

Sensor 240 may represent one or more different types of sensors as described with reference to FIG. 2. Sensor 240 may gather independent data about an object or may process the images captured by image capture device 202 and image capture device 204.

Each of image capture device 202, image capture device 204, and sensor 240 transmit captured images and data to one or more computing systems enabled to initially receive and buffer the captured images and data. In the example, image capture device 202 transmits captured images to image capture server 308, image capture device 204 transmits captured images to image capture server 310, and sensor 240 transmits captured data to sensor server 312. Image capture server 308, image capture server 310, and sensor server 312 may be implemented within one or more server systems.

Each of image capture server 308, image capture server 310, and sensor server 312 streams the buffered images and data from image capture device 202, image capture device 204, and sensor device 240 to one or more processors. In the example, image capture server 308 streams images to a video processor 316, image capture server 310 streams images to a video processor 318, and sensor server 312 streams the sensed data to sensor processor 319. It is important to note that video processor 316, video processor 318, and sensor processor 319 may be implemented within one or more processors in one or more computer systems.

In one example, image capture server 308 and image capture server 310 each stream images to video processor 316 and video processor 318, respectively, where the images are streamed in frames. Each frame may include, but is not limited to, a camera identifier (ID) of the image capture device, a frame number, a time stamp and a pixel count.

Video processor 316, video processor 318, and sensor processor 319 are programmed to detect and track objects within image frames. In particular, because video processor 316, video processor 318, and sensor processor 319 receive streams of complex data and process the data to identify three-dimensional objects, including objects representing monitored users, and characteristics of the three-dimensional objects, video processor 316, video processor 318, and sensor processor 319 may implement the Cell Broadband Engine (Cell BE) architecture (Cell Broadband Engine is a registered trademark of Sony Computer Entertainment, Inc.). The Cell BE architecture refers to a processor architecture which includes a base processor element, such as a Power Architecture-based control processor (PPE), connected to multiple additional processor elements also referred to as Synergetic Processing Elements (SPEs) and implementing a set of DMA commands for efficient communications between processor elements. In particular, SPEs may be designed to handle certain types of processing tasks more efficiently than others. For example, SPEs may be designed to more efficiently handle processing video streams to identify and map the points of moving objects within a stream of frames. In addition, video processor 316, video processor 318, and sensor processor 319 may implement other types of processor architecture that enables efficient processing of video images to identify, in three-dimensions, moving and stationary objects within video images from which behavior of monitored users, and whether the behavior represents behavioral signals which trigger control of a document, can be predicted.

In the example, video processor 316, video processor 318, and sensor processor 319 each create and stream the properties, including positions, color, size, shape, and orientation, of the detected objects to a geometry processor 320. In one example, each processed frame streamed to geometry processor 320 may include, but is not limited to, a camera ID, a frame number, a time stamp, and combinations of two or more of X axis coordinates (x_loc), Y axis coordinates (y_loc), and Z axis coordinates (z_loc). It is important to note that x_loc, y_loc, and z_loc may each include multiple sets of points and other data that identify all the properties of an object. If multiple objects are detected and tracked within a single frame, the X axis coordinates and Y axis coordinates for each object may be included in a single streamed object property record or in multiple separate streamed object property records. In addition, a streamed property frame, such as the frame from sensor processor 319 for a SONAR detected position, may include Z axis location coordinates, listed as z_loc, for example.

Geometry processor 320 receives the 2D streamed object properties from video processor 316 and video processor 318 and the other object data from sensor processor 319. Geometry processor 320 matches up the streamed 2D object properties and other data and constructs 3D object properties 110 from the streamed 2D object properties and other data. In particular, geometry processor 320 constructs 3D object properties 110 that include the depth of an object. In one example, each 3D object property record constructed by geometry processor 320 may include a time stamp, an object or user movement label, X axis coordinates (x_loc), Y axis coordinates (y_loc), and Z axis coordinates (z_loc), and additional information collected from sensors. For example, additional information collected from sensors may include a location identifier received from an RFID or GPS detected location coordinates.

At any of video processor 316, video processor 318, sensor processor 319, and geometry processor 320 property records may include at least one identifier to enable persistence in tracking the object. For example, the identifier may include a unique identifier for the object itself and an identifier of a class or type of object, including an object identified as user movement.

In particular, by video processor 316, video processor 318, and sensor processor 319 identifying and classifying object properties, each of the processors may access definition database 112 for accessing previously processed inputs and behavior mappings to more accurately identify and classify 2D object properties to detect and match the streamed 2D object properties to an object. In addition, geometry processor 320 may more accurately construct 3D properties of objects based on the streamed 2D object properties, based on previously matched and constructed 3D properties of objects accessed from definition database 112. Further, object database 122 may store the streamed 2D object properties and 3D object properties for future reference.

In addition, by video processor 316, video processor 318, and sensor processor 319 identifying and classifying object properties and by geometry processor constructing 3D object properties 110, each of the processors may identify detected objects, including behaviors of monitored people. For example, video processor 316, video processors 318, sensor processor 319, and geometry processor 320 may access definition database 112, which includes behavior definitions for use in mapping facial expressions and other body movements, performing facial and other body movement recognition, and performing additional processing to identify an object representing a behavior. In addition, video processor 316, video processors 318, sensor processor 319, and geometry processor 320 may access definition database 112, which includes behavior definitions for different types of environments for use in identifying a particular environment in which a user is located based on detected objects and background. Further, in constructing 3D object properties 110, video processor 316, video processors 318, sensor processor 319, and geometry processor 320 may identify multiple detected objects in the environment and therefore identify multiple behaviors of a single monitored person or one or more interactions between multiple people. By monitoring and identifying interactions between objects detected in the environment in which the object is located, more accurate prediction of a behavior in the context in which the behavior is made may be performed.

Figure 4:
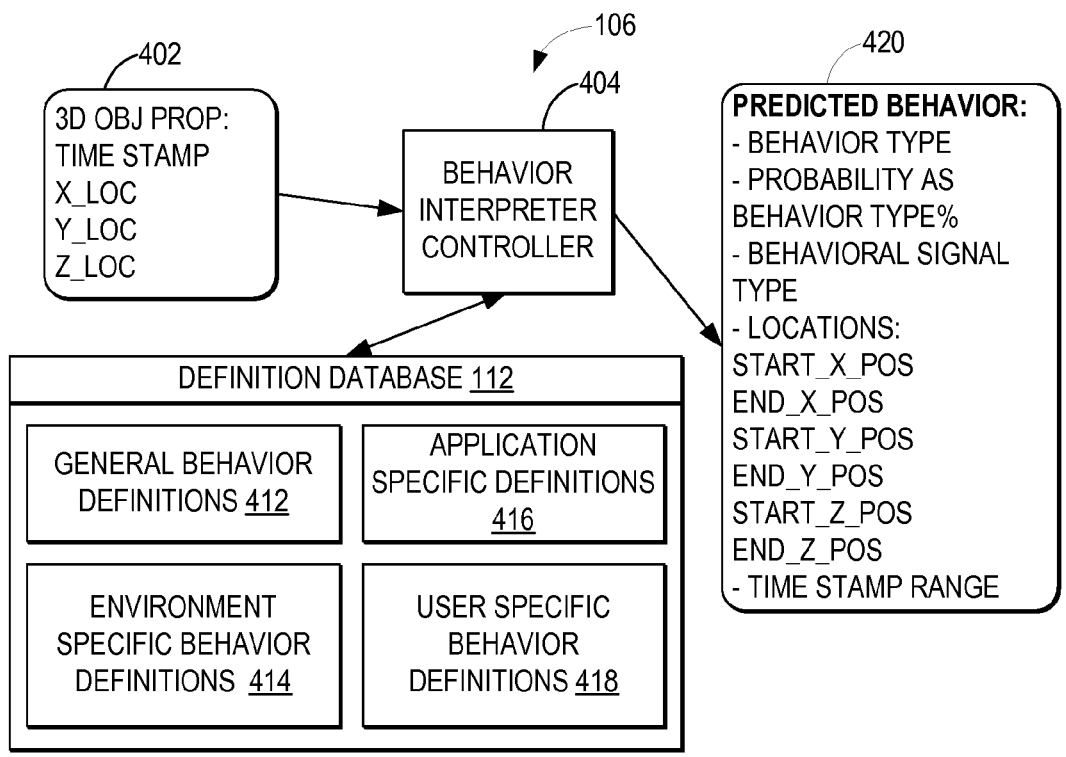
FIG. 4 is a block diagram depicting one embodiment of a behavior interpreter system.

Referring now to FIG. 4, a block diagram illustrates one embodiment of a behavior interpreter system. It is important to note that the multiple components depicted within behavior interpreter 106 may be incorporated within a single system or distributed via a network across multiple systems. In the example, a 3D properties record 402 includes "time stamp", "x_loc", "y_loc", and "z_loc" data elements. It will be understood that 3D properties record 402 may include additional or alternate data elements as determined by geometry processor 320 of FIG. 3. For example, 3D properties record 402 may include additional information identifying a particular or relative location of a user within a sensor area and not just within the focus area, colors, and other data collected by image capture devices and sensors and processed within 3D object detector 104.

Behavior interpreter 106 includes a behavior interpreter controller 404, where behavior interpreter controller 404 may include one or more processors programmed to perform behavior interpretation. For example, behavior interpreter controller 404 may include a processor with the CellBE architecture, programmed to efficiently process 3D object properties data streams, predict behaviors of monitored people from the 3D object properties streams, and predict whether the behaviors represent behavioral signals which trigger the control of a document. In addition, behavior interpreter controller 404 may include processors upon which software runs, where the software directs processing of 3D object properties streams, predicts behaviors of monitored people from the 3D object properties streams, and predicts whether the behaviors represent behavioral signals which trigger the control of a document.

In processing 3D object properties streams, predicting behaviors, and predicting whether behaviors represent behavioral signals which trigger control of a document, behavior interpreter controller 404 maps 3D object properties to one or more behavior definitions with a percentage probability that the streamed 3D object properties represent the mapped behavior definitions and with a percentage probability that the predicted behavior represents a behavioral signal which triggers control of a document. In particular, behavior interpreter controller 404 accesses one or more behavior definitions for one or more behaviors and determines whether the 3D object properties match one or more characteristics of one or more behaviors as defined in one or more of the behavior definitions. Behavior definitions may include mapped 3D models of one or more types of behaviors. In addition, behavior definitions may define the parameters of identifying characteristics of a behavior including, but not limited to, body part detected, type of movement, surface characteristics, shape, speed of movement, frequency, span of movement, depth of movement, temperature, and color.

In addition, behavior definitions are specified to enable behavior interpreter controller 404 to determine whether characteristics of a behavior indicate that the behavior is representative of a behavioral signal which trigger control of a document. For example, once behavior interpreter controller 404 determines that an object stream represents a person scratching one's nose, behavior interpreter controller 404 determines whether a person scratching one's nose represents a behavioral signal which triggers control of a particular document based on the type of document, the type of application, the type of environment, or other factors. For example, a person scratching one's nose during a meeting may not represent a behavioral signal which triggers inserting a textual indicator of the behavior in the text transcript of the meeting. Further, a nose scratch may be determined as a type of behavior which a user often performs involuntary, and therefore is not a behavioral signal. In contrast, a user holding up two fingers may be determined as a type of behavior which a user performs intentionally and for which a textual indicator should be added to a transcript or which should trigger a function to be performed by an application on a document.

It is important to note that in interpreting 3D object properties streams, behavior interpreter controller 404 performs an aggregate analysis of all the tracked objects in one or more 3D object properties streams identified for a particular focus area by one or more behavior processing systems. In one example, behavior interpreter controller 404 aggregates the 3D object property streams for a particular focus area and particular sensor area. In another example, behavior interpreter controller 404 may receive multiple 3D object properties streams from areas overlapping a focus area and sensor area, analyze the 3D object properties streams for similarities, location indicators, and orientation indicators, and construct the 3D object properties streams into a 3D aggregate representation of an area.

In one embodiment, behavior interpreter controller 404 may map the aggregate of the tracked objects directly into a single behavior definition. In another embodiment, behavior interpreter controller 404 maps multiple aggregated tracked objects into multiple behavior definitions. For example, a person may simultaneously communicate through facial behavior and a hand behavior, where in predicting the actual behaviors communicated through the tracked movement of the facial behavior and hand behavior, behavior interpreter controller 404 analyzes the 3D object properties of the facial behavior in correlation with the 3D object properties of the hand behavior and accesses behavior definitions to enable prediction of each of the behaviors and to enable prediction of whether the behaviors, in combination, represent behaviors representing a behavioral signal which triggers control of a document. Additionally, behavior interpreter controller 404 may aggregate the tracked objects representative of behavior by multiple monitored people within an environment. Behavior interpreter controller 404 then predicts whether the combination of behaviors by multiple monitored people is representative of behavioral signals Which trigger control of a document.

In the example, behavior interpreter controller 404 accesses behavior definitions from definition database 112, which includes general behavior definitions 412, environment specific behavior definitions 414, application specific definitions 416, and user specific behavior definitions 418. It will be understood that definition database 112 may include additional or alternate types of behavior definitions. In addition, it is important to note that each of the groupings of behavior definitions illustrated in the example may reside in a single database or may be accessed from multiple database and data storage systems via a network.

General behavior definitions 412 include behavior definitions for common behaviors. For example, general behavior definitions 412 may include behaviors definitions for common behaviors, such as a person pointing, a person waving, a person nodding "yes" or shaking one's head "no", or other types of common behaviors.

Environment specific behavior definitions 414 include behavior definitions and factors for predicting a behavior and predicting whether a behavior represents a behavioral signal for which triggers control of a document that are specific to the context in which the behavior is being detected. Examples of contexts may include, but are not limited to, the current location of a monitored person, the type of document currently accessed by the user, the time of day, the cultural meanings behind gestures and other behaviors within the context, the languages spoken within the context, and other factors that influence the context in which behavior could be interpreted. Behavior interpreter controller 404 may detect current context from accessing a GPS indicator of a monitored person location, from performing speech analysis of the monitored person's speech to detect variations in language and dialect, from detecting objects within the image data indicative of particular types of locations, or from receiving additional data from other systems monitoring the context in which a monitored person is monitored.

Application specific definitions 416 include behavior definitions specific to the application which will be triggered to control the document based on predicted behavior output 108. For example, if predicted behavior 108 will trigger an application to insert a textual indicator of a behavior to a document, application specific definitions 416 specify behavior definitions for the types of behaviors that would be relevant to addition as a textual indicator in a document. In another example, if predicted behavior 108 will trigger an application to perform a function on a document, then application specific definitions 416 specify behavior definitions for the types of behaviors that would be relevant to triggering a function to be performed on a document. In addition, application specific definitions 416 may include definitions for detecting current processes performed by an application that would affect the meaning of a behavior or would effect whether a particular behavior is relevant to triggering a function to be performed on a document.

User specific behavior definitions 418 include behavior definitions specific to a particular person being monitored. In one example, behavior interpreter controller 404 accesses an identifier for a user from facial or voice recognition performed by a sensor or by behavior interpreter controller 404. In addition, behavior interpreter controller 404 may not identify the actual identity of a monitored person, but may identify attributes of a person that identify the person as a type of person whose behaviors trigger document control. In another example, facial recognition may be supplemented or identification may be performed solely from scanning for an RFID on identification carried by the monitored person, detecting a particular item worn by a user, or accessing other types of identification from a system monitoring the identification of a user.

Definition database 112 may also include behavior definitions and other factors specified according to a level of experience of a monitored person within a particular environment. For example, the characteristics of a behavior in a behavior definition and the specific behavior definitions grouped within definition database 112 may be specified according to the level of experience of a user in triggering document control based on behavioral signals.

Further, within the available behavior definitions, a behavior definition may be associated with a particular area of movement or a particular depth of movement within a 3D focus area. In particular, the three-dimensional focus area in which movement is detected may be divided into three-dimensional portions, where movements made in each of the portions may be interpreted under different selections of behavior definitions. For example, one three-dimensional portion of a focus area may be considered an "active region" where movement detected within the area is compared with a selection of behavior definitions associated with that particular active region, such as a region within a particular distance of a keyboard or other area in which a user may trigger document control based on behavioral signals.

Additionally, within behavior definitions included within definition database 112, the predictability of a behavior may be increased by the presence of associated audio signatures or translated text from audio. In particular, sensor 240 or another audio sensor may detect audio from an environment or from a specific person. Behavior interpreter controller 404 may determine whether sensed audio increases the probability that a detected movement represents a particular type of behavior. In one example, behavior interpreter controller 404 may convert audio signals into text and determine whether the text matches types of words typically associated with a behavioral signal.

The behavior definitions included within definition database 112 may be added to or adjusted based on user feedback of a monitored person in a similar manner as a speech recognition system is trained to more accurately map and predict behaviors. For example, definition database 112 may learn additional behavior definitions and adjust the parameters of already learned behavior definitions through a monitored person indicating whether the specific type of document control trigger responsive to a behavior is the type of document control intended to be triggered by the user's behavioral signal.

Behavior interpreter controller 404 may output predicted behavior output 108 in the form of one or more behavior records, such as behavior record 420. Behavior record 420 indicates the "behavior type", "probability % as the behavior", and "behavioral signal type". The "behavioral signal type" may indicate, for example, a percentage probability of the behavior as a behavioral signal. In another example, the "behavioral signal type" may indicate an identifier for the user, the type of environment, an application, or a document to which the behavioral signal is associated. In addition, the "behavioral signal type" may include additional or alternate types of data gathered by behavior interpreter 404 in predicting a behavior type and predicting whether that behavior type represents a behavioral signal which triggers control of a document. Alternatively, a behavior interpreter controller 404 may transmit any predicted behavior to a document control system in predicted behavior record 420 and enable the document control system to determine whether the predicted behavior type triggers control of a document by the document control system.

In addition, as illustrated, behavior record 420 includes the start X, Y, and Z axis properties and ending X, Y, and Z axis properties of the detected behavior, indicative of the location, direction of movement, and speed of movement of the behavior, listed as "start_x_pos", "end_x_pos", "start_y_pos", "end_y_pos", "start_z_pos", "end_z_pos", and the time stamp range indicating the times over which the behavior is detected. In addition or alternatively, behavior record 420 may include indicators of the location, direction of movement, intensity of movement, and speed of movement of the monitored person. Further, additional information acquired from sensors, such as RFID data, GPS coordinates, skin surface characteristics, and other sensed data, may be associated with a particular behavior record or included in a separate object record.

In passing behavior record 420, behavior interpreter controller 404 may filter out particular types of behavior records. For example, behavior interpreter controller 404 may not pass records where the predictability of a behavior as a behavior type is less than a particular percentage. In addition, in passing behavior record 420, behavior interpreter controller 404 may filter one type of behavior records for passing to one type of document control system and filter other types of behavior records for passing to another type of document control system.

Figure 5:
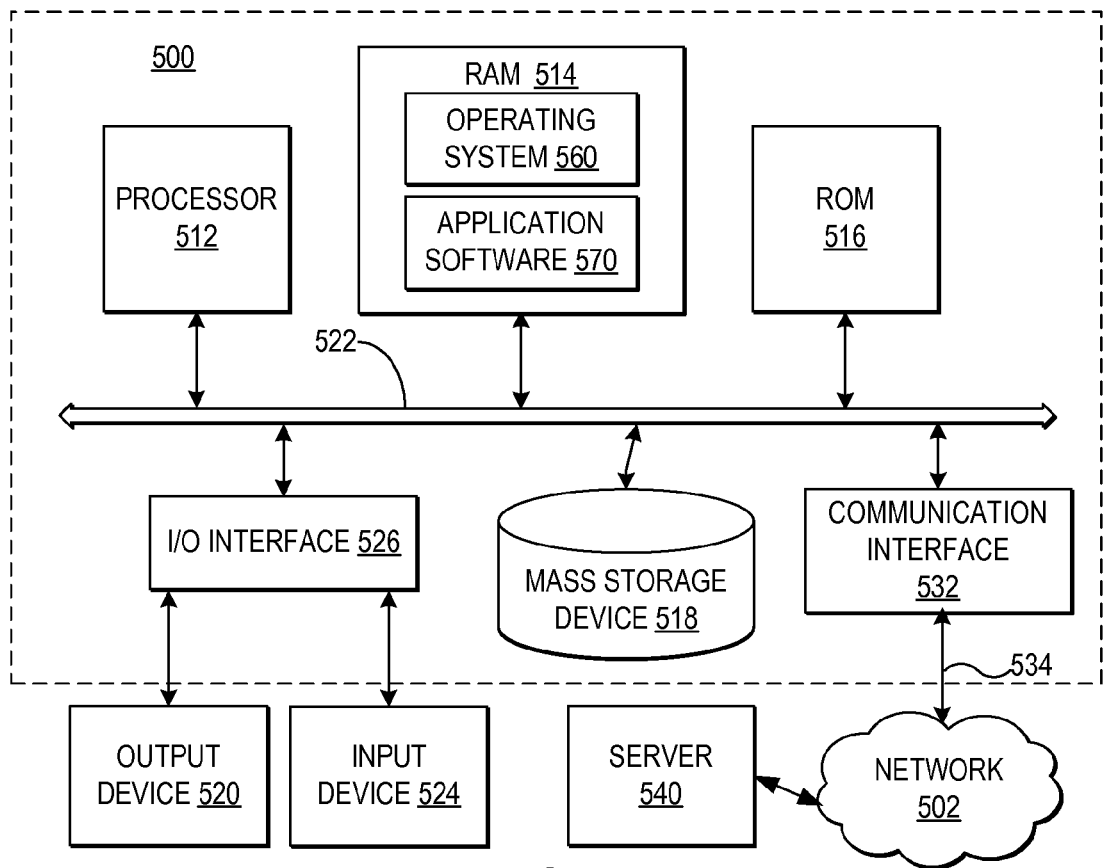
FIG. 5 is a block diagram illustrating one embodiment of a computing system in which the present invention may be implemented.

With reference now to FIG. 5, a block diagram depicts one embodiment of a computing system in which the present invention may be implemented. The controllers and systems of the present invention may be executed in a variety of systems, including a variety of computing systems, such as computer system 500, communicatively connected to a network, such as network 502.

Computer system 500 includes a bus 522 or other communication device for communicating information within computer system 500, and at least one processing device such as processor 512, coupled to bus 522 for processing information. Bus 522 preferably includes low-latency and higher latency paths that are connected by bridges and adapters and controlled within computer system 500 by multiple bus controllers. When implemented as a server, computer system 500 may include multiple processors designed to improve network servicing power. Where multiple processors share bus 522, an additional controller (not depicted) for managing bus access and locks may be implemented.

Processor 512 may be a general-purpose processor such as IBM's PowerPC™ processor that, during normal operation, processes data under the control of an operating system 560, application software 570, middleware (not depicted), and other code accessible from a dynamic storage device such as random access memory (RAM) 514, a static storage device such as Read Only Memory (ROM) 516, a data storage device, such as mass storage device 518, or other data storage medium. In one example, processor 512 may further implement the CellBE architecture to more efficiently process complex streams of data in 3D. It will be understood that processor 512 may implement other types of processor architectures. In addition, it is important to note that processor 512 may represent multiple processor chips connected locally or through a network and enabled to efficiently distribute processing tasks.

In one embodiment, the operations performed by processor 512 may control 3D behavior detection from captured images and data for an environment in which a person may communicative through behaviors, recognizing the behaviors, determining which behaviors represent behavioral signals which trigger control of a document, and controlling a document responsive to behavioral signals as depicted in the operations of flowcharts of FIGS. 11-14 and other operations described herein. Operations performed by processor 512 may be requested by operating system 560, application software 570, middleware or other code or the steps of the present invention might be performed by specific hardware components that contain hardwired logic for performing the steps, or by any combination of programmed computer components and custom hardware components.

The present behavior processing system and behavior-enabled document control system may be provided as a computer program product, included on a computer or machine-readable medium having stored thereon the executable instructions of a computer-readable program that when executed on computer system 500 cause computer system 500 to perform a process according to the present invention. The terms "computer-readable medium" or "machine-readable medium" as used herein includes any medium that participates in providing instructions to processor 512 or other components of computer system 500 for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 500 can read and which is suitable for storing instructions. In the present embodiment, an example of a non-volatile medium is mass storage device 518 which as depicted is an internal component of computer system 500, but will be understood to also be provided by an external device. Volatile media include dynamic memory such as RAM 514. Transmission media include coaxial cables, copper wire or fiber optics, including the wires that comprise bus 522. Transmission media can also take the form of acoustic or light waves, such as those generated during radio frequency or infrared data communications.

Moreover, the present invention may be downloaded or distributed as a computer program product, wherein the computer-readable program instructions may be transmitted from a remote computer such as a server 540 to requesting computer system 500 by way of data signals embodied in a carrier wave or other propagation medium via network 502 to a network link 534 (e.g. a modem or network connection) to a communications interface 532 coupled to bus 522. In one example, where processor 512 includes multiple processor elements, then a processing task distributed among the processor elements, whether locally or via a network, may represent a computer program product, where the processing task includes program instructions for performing a process or program instructions for accessing Java (Java is a registered trademark of Sun Microsystems, Inc.) objects or other executables for performing a process. Communications interface 532 provides a two-way data communications coupling to network link 534 that may be connected, for example, to a local area network (LAN), wide area network (WAN), or directly to an Internet Service Provider (ISP). In particular, network link 534 may provide wired and/or wireless network communications to one or more networks, such as network 502. Further, although not depicted, communication interface 532 may include software, such as device drivers, hardware, such as adapters, and other controllers that enable communication. When implemented as a server, computer system 500 may include multiple communication interfaces accessible via multiple peripheral component interconnect (PCI) bus bridges connected to an input/output controller, for example. In this manner, computer system 500 allows connections to multiple clients via multiple separate ports and each port may also support multiple connections to multiple clients.

Network link 534 and network 502 both use electrical, electromagnetic, or optical signals that carry digital data streams. The signals through the various networks and the signals on network link 534 and through communication interface 532, which carry the digital data to and from computer system 500, may be forms of carrier waves transporting the information.

In addition, computer system 500 may include multiple peripheral components that facilitate input and output. These peripheral components are connected to multiple controllers, adapters, and expansion slots, such as input/output (I/O) interface 526, coupled to one of the multiple levels of bus 522. For example, input device 524 may include, for example, a microphone, a video capture device, a body scanning system, a keyboard, a mouse, or other input peripheral device, communicatively enabled on bus 522 via I/O interface 526 controlling inputs. In addition, for example, an output device 520 communicatively enabled on bus 522 via I/O interface 526 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 5 may vary. Furthermore, those of ordinary skill in the art will appreciate that the depicted example is not meant to imply architectural limitations with respect to the present invention.

Figure 6:
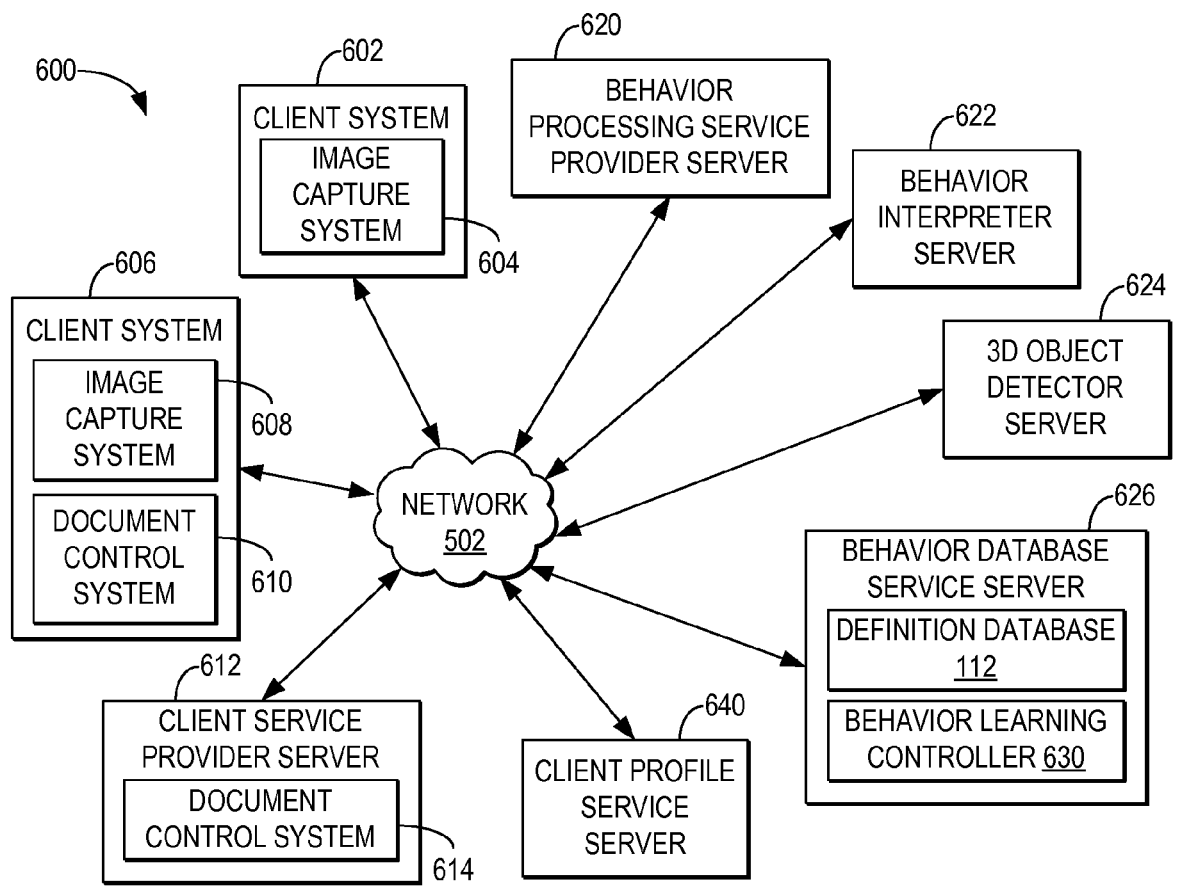
FIG. 6 is a block diagram depicting one example of a distributed network environment in which a behavior-enabled document control method, system, and program may be implemented.

Referring now to FIG. 6, a block diagram depicts one example of a distributed network environment in which a behavior-enabled document control method, system, and program may be implemented. It is important to note that distributed network environment 600 is illustrative of one type of network environment in which the behavior-enabled document control method, system, and program may be implemented, however, the behavior-enabled document control method, system, and program may be implemented in other network environments. In addition, it is important to note that the distribution of systems within distributed network environment 600 is illustrative of a distribution of systems; however, other distributions of systems within a network environment may be implemented. Further, it is important to note that, in the example, the systems depicted are representative of the types of systems and services that may be accessed or request access in implementing a behavior processing system and a behavior-enabled document control system. It will be understood that other types of systems and services and other groupings of systems and services in a network environment may implement the behavior processing system and behavior-enabled document control system.

As illustrated, multiple systems within distributed network environment 600 may be communicatively connected via network 502, which is the medium used to provide communications links between various devices and computer communicatively connected. Network 502 may include permanent connections such as wire or fiber optics cables and temporary connections made through telephone connections and wireless transmission connections, for example. Network 502 may represent both packet-switching based and telephony based networks, local area and wide area networks, public and private networks. It will be understood that FIG. 6 is representative of one example of a distributed communication network for supporting a behavior processing system and behavior-enabled document control system; however other network configurations and network components may be implemented.

The network environment depicted in FIG. 6 may implement multiple types of network architectures. In one example, the network environment may be implemented using a client/server architecture, where computing systems requesting data or processes are referred to as clients and computing systems processing data requests and processes are referred to as servers. It will be understood that a client system may perform as both a client and server and a server system may perform as both a client and a server, within a client/server architecture. In addition, it will be understood that other types of network architectures and combinations of network architectures may be implemented.

In the example, distributed network environment 600 includes a client system 602 with an image capture system 604 and a client system 606 with an image capture system 608. In one example, image capture systems 604 and 608 represent stereoscopic image devices implementing one or more image capture devices, such as image capture devices 202 and 204, and may include one or more sensors, such as sensor 240. Image capture systems 604 and 608 capture images and other data and stream the images and other data to other systems via network 502 for processing. In addition, stereoscope image capture systems 604 and 608 may include video processors for tracking object properties, such as video processor 316 and video processor 318, described with reference to FIG. 3 and a geometry processor for generating streams of 3D object properties, such as geometry processor 320, described with reference to FIG. 3.

In one example, each of client system 602 and client system 606 may stream captured image frames to one or more 3D object detection services. In one example, an behavior processing service provider server 620 provides a service that includes both an object detector service, such as 3D object detector 104, for processing streamed images and other data and an behavior interpreter service, such as behavior interpreter 106, for predicting a type of behavior, predicting a probability that the captured images represent the predicted type of behavior, and predicting whether the behavior represents a behavioral signal which triggers control of a document, and controlling output of the predicted behavior records to one or more other systems accessible via network 502.

As to behavior processing service provider server 620, different entities may implement a behavior processing service and different entities may access the behavior processing service. In one example, a user logged into one of client systems 602 or client system 606 may subscribe to the behavior processing service. In another example, an image capture system or a particular application requesting behavior processing may automatically stream captured images and data to the behavior processing service. In yet another example, a business or other entity may implement the behavior processing service in a communications network.

In another example, each of client system 602 and client system 606 may stream captured frames to a 3D object detector server 624. 3D object detector server 624 receives captured images and other data from image capture systems, such as image capture system 604 or image capture system 608, and processes the images and other data to generate 3D object properties of detected behaviors, for output to a behavior interpreter system, such as behavior interpreter server 622 or behavior processing service provider server 620. In additional or alternate embodiments, an object detector service may be implemented within one or more other systems, with one or more other services performed within those systems. In particular, in additional or alternate embodiments, a 3D object detector service may be implemented within a client system at which the images and other data are captured.

Each of the server systems described may be distributed across one or more systems. In addition, each of the server systems may be distributed across systems with 3D image processing power, including processors with the CellBE architecture programmed to perform efficient 3D data processing. In one example, an entity, such as a business or service provider, may implement separate server systems for object detection and behavior interpretation, wherein multiple behavior interpreter servers are implemented with each behavior interpreter server processing different types of 3D object properties.

Behavior processing service provider server 620, behavior interpreter server 622, and 3D object detector server 624 may locally store a definition database, such as definition database 112, of raw images, 3D behavior properties, behavior definitions, and other object definitions. In addition, behavior processing service provider server 620, behavior interpreter server 622 and 3D object detector server 624 may access a behavior database service server 626 that facilitates definition database 112.

In addition, behavior database service server 626 includes a behavior learning controller 630. Behavior learning controller 630 prompts users, to provide samples of particular types of behaviors which should be recorded through a textual indicator in a document or which should represent behavioral signals for a particular function to be performed on a document. In addition, behavior learning controller 630 prompts users to indicate whether predicted behavior types are accurately predicted. In addition, behavior learning controller 630 gathers other information that enables behavior learning controller 630 to learn and maintain behavior information in definition database 112 that when accessed by behavior object detector services and behavior interpreter services, increases the accuracy of generation of 3D object properties and accuracy of prediction of behaviors and whether behaviors represent behavioral signals from 3D object properties by these services.

Further, behavior processing service provider server 620, behavior interpreter server 622, 3D object detector server 624, or behavior database service server 626 may access additional context information for a user specifying the types of behaviors that represent behavioral signals for a particular user from a client profile service server 640. I In one example, client profile service server 640 facilitates capturing and storing behavior definitions for particular types of behaviors which are then accessible to multiple services, such as behavior processing service provider server 620 and behavior interpreter server 622, such that a user need not provide a separate gesture sample to each of the separate servers.

Behavior processing service provider server 620 and behavior interpreter server 622 stream predicted behavior records, such as predicted behavior record 420, to behavior-enabled applications via network 502. In the example embodiment, client system 606 includes a document control system 610 which is a behavior-enabled document control system, enabling client system 606 to determine and control documents, in a single application or across multiple applications, based on behavior records and other data. Document control system 610 at client system 606 may receive predicted behavior records from client system 606, as captured by image capture system 608, or may receive predicted behavior records based on images and data detected by other image capture systems.

In addition, in the example embodiment, client service provider server 612 includes a document control system 614 which is a behavior-enabled document control service for enabling client service provider server 612 to control documents based on behavior records for multiple subscribers. In particular, client service provider server 612 represents a server which provides a document control service to one or more subscribing client systems or subscribing users. Document control system 614 may receive behavior records associated with a particular user, a particular image capture system, a particular client system, a particular environment, or other associations and determine and output control signals for document control to one or more client systems. In addition, document control system 614 may receive behavior records, determine required document control based on the behavior records, and perform the required document control.

Figure 7:
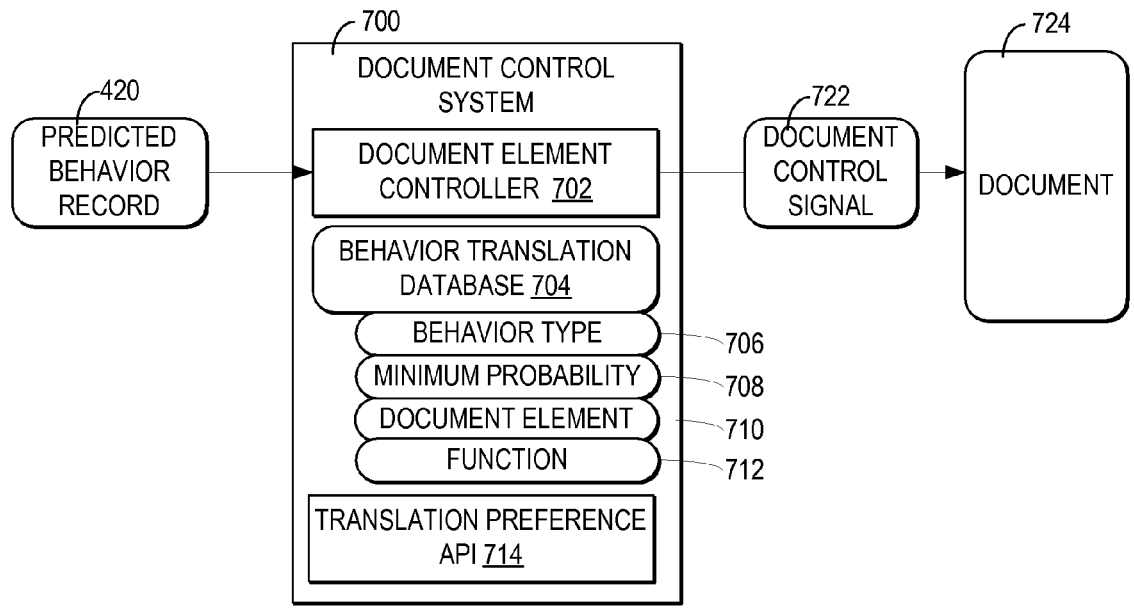
FIG. 7 is a block diagram illustrating one example of an implementation of a behavior processing system communicating with a behavior-enabled document control system.

With reference now to FIG. 7, a block diagram illustrates one example of an implementation of a behavior processing system communicating with a behavior-enabled document control system. Document control system 700 receives predicted behavior records, such as predicted behavior record 420, from behavior processing system 100. Based on the predicted behavior records, document control system 700 specifies a document control signal 722 for controlling a specific document, such as document 724, or for controlling multiple documents. In one example, the document control signal may specify an element to insert into a document or a function to apply to a document.

In the example, a document element controller 702 receives predicted behavior record 420 and translates the behavior into document control system 722 based on behavior translation database 704. In the example, behavior translation database 706 includes multiple entries for translating a behavior type 706 and minimum probability 708 from predicted behavior record 420, into a document element 710 or a function 712 to be applied to the document.

In particular, document element 710 may represent a textual or graphical element. In addition, document element 710 may specify the behavior performed by a user or may specify a textual or graphical element translated from a behavior performed by a user. For example, if a user holds up a pointer finger, document element 710 may include a textual statement of "user holds up a pointer finger", a graphical element of a hand with a pointer finger held up, a textual statement of "one", or a textual statement of "wait", depending on whether the behavior is translated into a literal indicator of the behavior or translated into an indicator of the meaning of the behavior, such as representing the number "one" or representing a request for someone to wait.

Function 712 may represent a function to be applied to an entire document, to a portion of a document, or to a particular element within a document. Examples of function 712 may include, but are not limited to, specifying text formatting, such as changing text to bold, italics, or strikethrough, tool application, such as spell checking or tracking changes in a document, or other specific functions of an application.

In addition, it is important to note that that a behavior type may be translated into one or more document elements and function elements. In one example, a user may point to multiple people during a meeting, where pointing to the people triggers function element 712 requesting that an email application access the email addresses of those persons pointed to and triggers document element 710 to insert the email addresses as cc: addressees of an electronic mail message. In another example, a predicted behavior record may specify a behavior of pointing to an x-ray or other displayed document and specify the position within the document pointed to. Function element 712 may request a function for creating a comment box at the position in the document pointed to. Document element 710 may specify the textual or graphical indicator to add to the comment box, including, but not limited to, a translation of any speech into text detected in association with pointing at the document, a textual indicator of the user pointing and a time stamp, or other textual or graphical indicators of other behavior types.

In one example, document control system 700 is a functional component of a particular application which controls document 724. In another example, document control system 700 is implemented separately from a particular application and transmits document control signal 722 as input to the application controlling document 724.

In addition, document control system 700 includes a document preference application programming interface (API) 714. In one example, document preference API 714 enables an interface through which a user may select whether predicted behavior types should be translated into document elements or functions. In another example, document preference API 714 enables an application to specify whether the application applies document control signals for inserting document elements or only applies document control signals for applying a function to a document. In addition, document preference API 714 enables an application to specify selections of types translate into document elements and selections of behavior types translate into functions.

Figure 8:
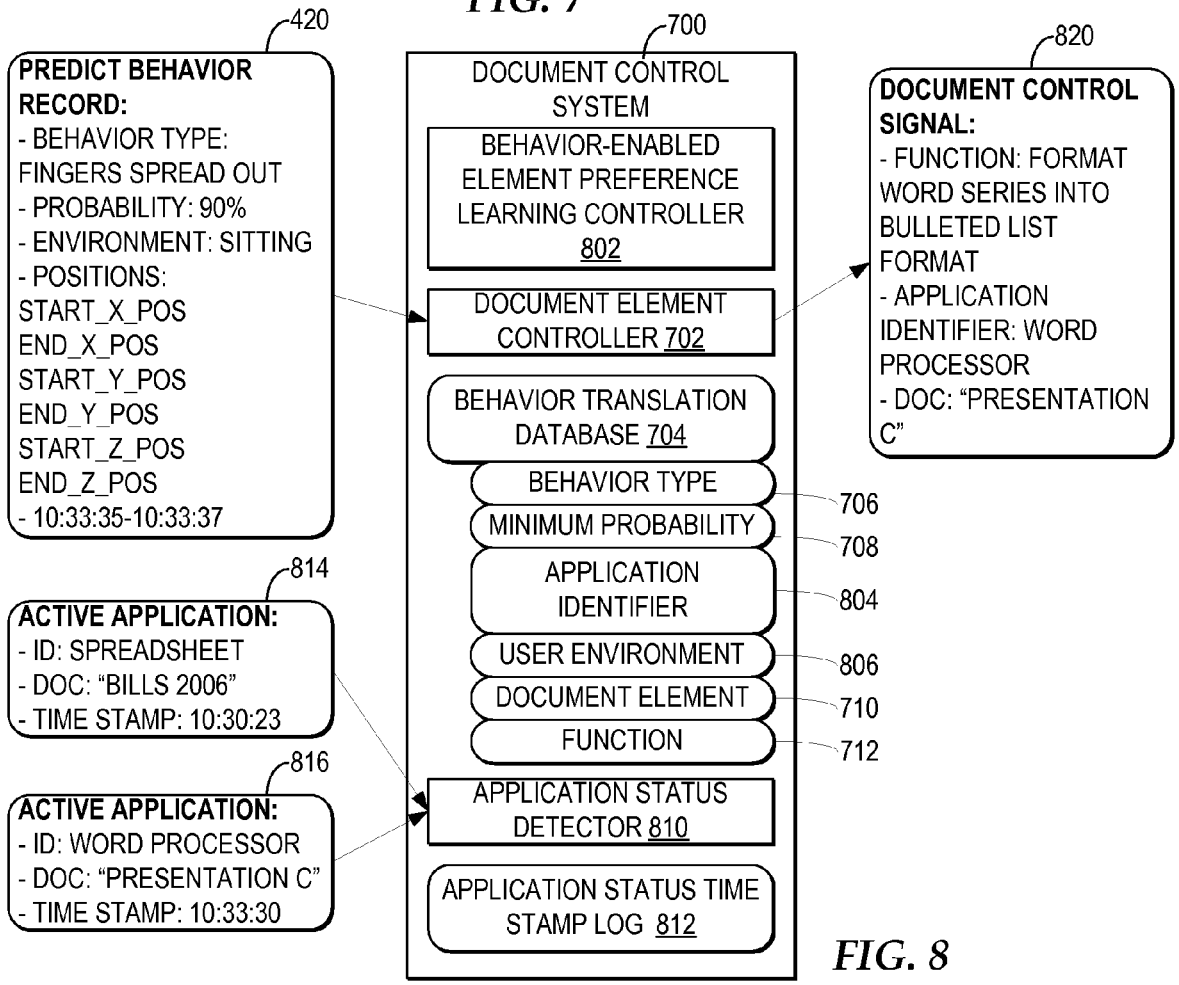
FIG. 8 is a block diagram depicting one example of a document control system for managing document control signals for multiple applications.

Referring now to FIG. 8, a block diagram illustrates one example of a document control system for managing document control signals for multiple applications. In the example, document control system 700 includes a translation preference learning controller 802. As will be further described, translation preference learning controller 802 facilitates an interface through which a user may select, for each separate application, rules for translating behavior types, for storage in behavior translation database 704. In one example, a translation rules translates a behavior type 706, with a minimum probability of being correctly predicted 708, for a particular application identifier 804, into a particular document element 710 or function of the identified application 712. In addition, a factor in translating a behavior type may also include a user environment 806 which may include a specific user environment or one or multiple application modes.

In one example, if a user is viewing a slide presentation application and the user environment specifies that the user is viewing the slide presentation in a project creation mode, for creating the frames of the presentation document, then the behavior types for this environment specified for translation within behavior translation database 704 separately than if a user is viewing a slide presentation in a user environment of the application's presentation mode. In one example, a user may specify a particular behavior type, such that when the user environment is presentation mode, that particular behavior type translates into a function for triggering the application to advance to the next frame in the presentation document. In another example, a user may specify a selection of behavior types that if made when the user environment is presentation mode, should trigger the presentation application to insert textual or graphical indicators of the behavior types within the frames of the presentation or within a recording of the presentation. In one example, a recording of a presentation may include a record of the frames, including a record of the speech converted into text associated with the frames as displayed and the text or graphical indicators of a behavior type associated with the frames as displayed.

In addition, document control system 700 includes an application status detector 810 that detects the status of the current active application accessible to the user. Application status detector 810 records application status records, such as application status records 814 and 816, in an application status time stamp log 812. In the example, application status records 814 and 816 include an identifier (ID) for the application, at least one document opened within the application and a time stamp when the application was selected as the active application. By recording a time stamp of when an application is active and the document or documents open within the application, document element controller 702 may more accurately map the time stamp range of predicted behavior record 420 to the application or series of applications and document active when the behavior was detected.

In one example, document element controller 702 receives predicted behavior record 720 with a time stamp matching application status record 816. Based on an entry in behavior translation database 704, document element controller 702 translates the predicted behavior type of "fingers spread out", with a probability of "80%" and an environment of "sitting", into a function of "format word series into bulleted list format". In the example, document element controller 702 generates document control signal 820 with instructions to perform a function of "format word series into bulleted list format" for the application identifier "word processor" and the document "presentation C". In the example, the function element of document control signal 820 includes a description of the function, however, the function element may also include a key command, function call, or other directions for specifically calling an application to perform a particular function.

Figure 9:
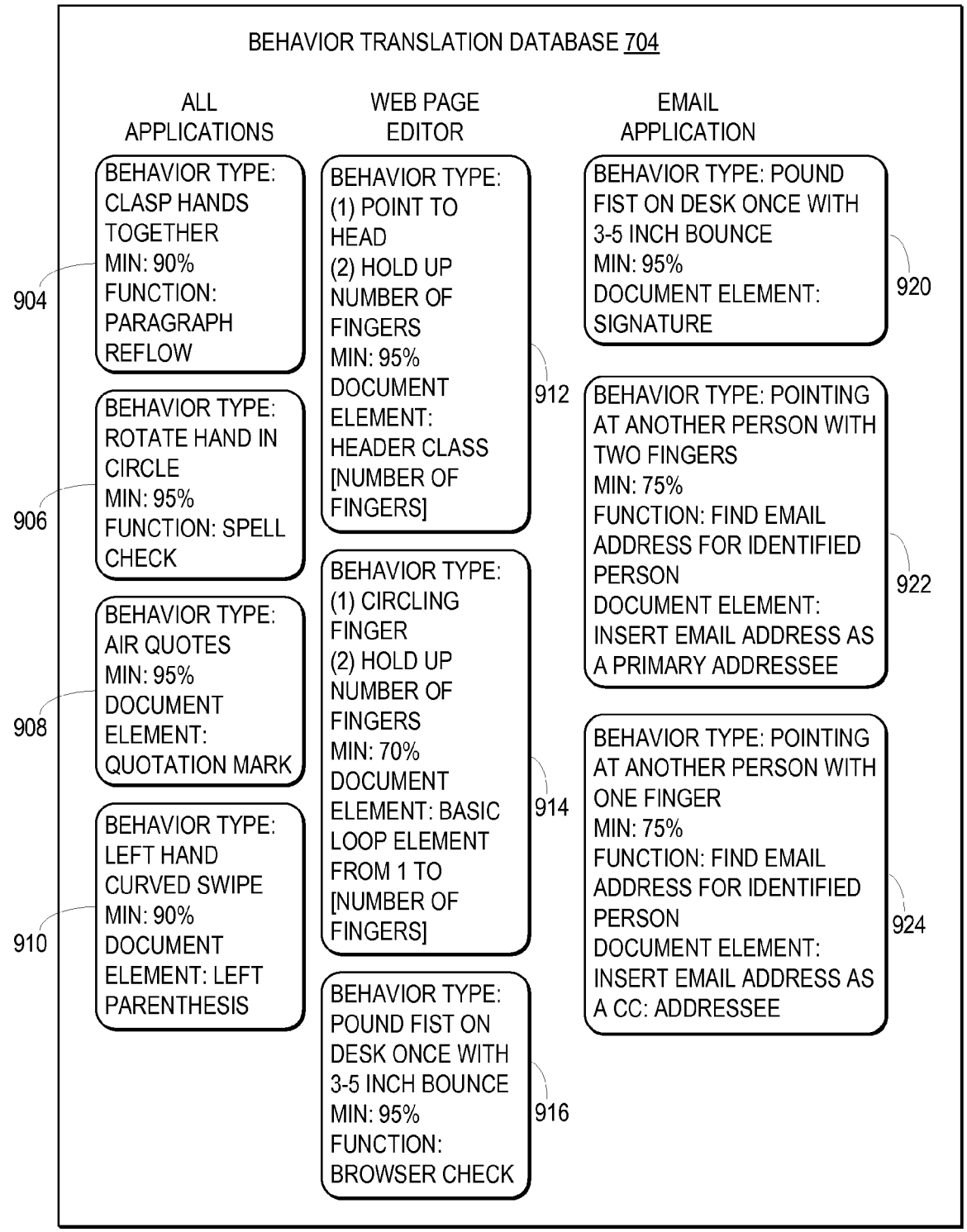
FIG. 9 is an illustrative diagram illustrating examples of entries in a behavior translation database.

With reference now to FIG. 9, a block diagram illustrates examples of entries in a behavior translation database. In the example, the entries displayed according to the application with which each entry is assigned. In particular, entries 904, 906, 908, and 910 are applicable to all applications, entries 912, 914, and 916 are applicable to a web page editor application, and entries 920, 922, and 924 are applicable to an email application. It will be understood that behavior translation database 704 may include entries applicable to one or more applications, as depicted, and may include entries applicable to additional or alternate applications from the applications depicted.

In the first column of entries applicable to all applications, entry 904 specifies that for a behavior type of "clasp hands together" with a minimum probability of 90%, then a function of "paragraph reflow" should be triggered for one or more documents. In a next example, entry 906 specifies that for a behavior type of "rotate hands in circle" with a minimum probability of 95%, then a function of "spell check" should be triggered for one or more documents. Entry 908 specifies that for a behavior type of "air quotes" with a minimum probability of 95%, a "quotation mark" should be inserted as a document element in a document. In addition, entry 910 specifies that for a behavior type of "left hand curved swipe" with a minimum probability of 90%, a "left parenthesis" should be inserted as a document element in a document. It will be understood that additional or alternate types of entries may be applied to all applications. In addition, it will be understood that while an entry may apply to more than one application, the entry may include multiple separate function calls for actually triggering the function in each of the applications.

In the next column of entries applicable to a web page editor application, entry 912 specifies that for a series of behaviors of "point to head" and "hold up number of fingers" with a minimum probability of 95%, a header class element numbered with the number of fingers should be added as a document element. For example, if the user holds up three fingers, then the class reference of "<h3> </h3>" would be added to the document. In a next example, entry 914 specifies that for a series of behaviors of "circling finger" and "hold up number of fingers" with a minimum probability of 70%, a loop element with the basis of 1 to the number of fingers held up should be added as a document element. For example, if the user flashes 10 fingers twice, then the loop element of "for (1; x<20) x++;". In particular, entry 912 and 914 illustrate that a user may specify behaviors representative of behavioral signals for generating programming code elements, equations, or modules commonly used by a programmer.

In a next selection of entries, entry 916 and 920 are specified for separate applications and include the same behavior type, but trigger different types of functions. In particular, entry 916 specifies that for a behavior of "pound fist on desk once with a 3-5 inch bounce" with a minimum probability of 95%, a "browser check" function of the web page editor should be triggered. In the example, the bounce range indicates the expected range of upward movement of a fist after hitting the desk. Entry 920 specifies that for the same behavior, but within the context of an email application, the email application should be triggered to insert a document element of an electronic signature. In the example, although the same behavior of a pounding fist triggers different functions in different applications, both of the functions are representative of functions typically performed when a user is concluding a draft. For example, a user triggers a browser check function when the user is ready to check how coded HTML will appear in a browser window and a user triggers an electronic signature function when the user is ready to sign off on an email composition. In other embodiments, a user may select a same behavior type with slight variations, such as a pounded fist with a smaller or greater bounce range, may trigger different functions in a same application or different functions across different applications.

In addition, in the example, entries 922 and 924 illustrate a behavior type that triggers an application to perform functions and to insert document elements. In the example, entry 922 specifies that for a behavior of "pointing another person with two fingers" with a minimum probability of 75%, a function of "find email address for identified person" is triggered and a document element of "insert email address as primary addressee" is triggered. Entry 924 distinguishes that for a behavior of "point at another person with one finger", then the same function is triggered as in entry 922, but the document element requires "insert email address as a cc: addressee", where an email application allows a user to address the email to one or more primary recipients and one or more carbon copy (cc) recipients. It is important to note that when a predicted behavior record is translated into function and document elements, document control system 700 may send a document control signal with both the function and document elements, or document control system 700 may send a first function request and then, based on the results of the first function, send a document control signal for inserting the document element.

Figure 10:
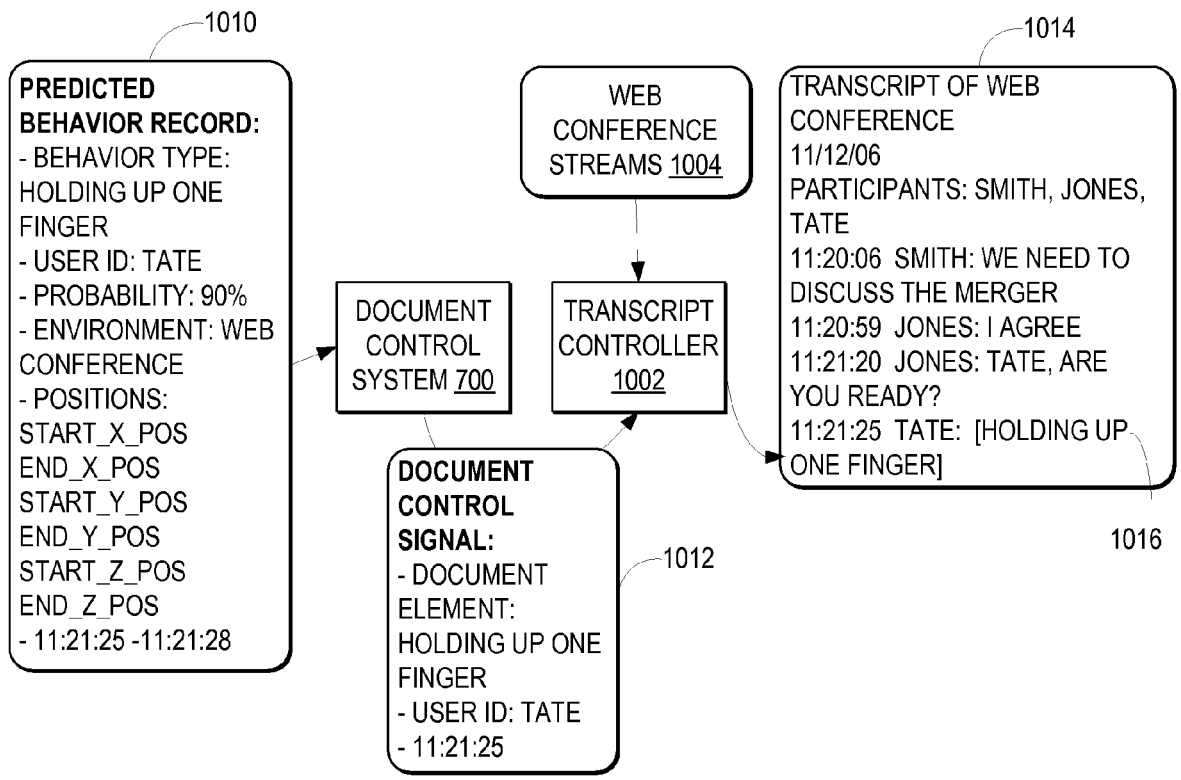
FIG. 10 is an illustrative diagram depicting one example of inserting a document element into a document, where the document element is a textual indicator of a behavior type.

With reference now to FIG. 10, a block diagram illustrates inserting a document element into a document, where the document element is a textual indicator of a behavior type. In the example, document control system 700 receives predicted behavior record 1010 with a behavior type of "holding up one finger", a probability of 90%, for a user identifier (ID) of "Tate", and a time range of "11:21:25-11:21:28." Document control system 700 determines, based on one or more entries in behavior translation database 704, to translate predicted behavior record 1010 into a document control signal 1012 inserting a document element of "holding up one finger" for the user identifier as "Tate" at the time stamp 11:21:25.

In the example, predicted behavior record 1010 is within the context of a web conference. A transcript controller 1002 receives web conference streams of video, audio, and text entered during the web conference. Behavior processing system 100 may also access web conference streams 1004 and generate predicted behavior record 1010 from web conference streams 1004. In another example, behavior processing system 100 may capture image streams of a user independent of web conference streams 1004 and generate predicted behavior record 1010 from the captured image streams.

In particular, in the example, transcript controller 1002 transcribes web conference streams 1004 from all the web conference participants into transcript 1014. In addition, transcript controller 1002 receives document control signals from one or more document control systems, such as document control signal 1012 from document control system 700 and inserts document elements specified in document control signals into transcript 1014. In the example, transcript controller 1002 inserts entry 1016 responsive to document control signal 1012.

Referring now to FIG. 11, a high level logic flowchart depicts a process and program for a behavior processing system to predict behavior types with a percentage probability. In the example, the process starts at block 1100, and thereafter proceeds to block 1102. Block 1102 depicts capturing, via a stereoscopic image device, multiple image streams and via sensors, sensor data, within a focus area. Next, block 1104 illustrates tracking objects within the images and sensor data. Thereafter, block 1106 depicts generating a stream of 3D object properties for tracked objects. Thereafter, block 1108 depicts aggregating the 3D object properties for each of the tracked objects. In particular, the aggregated 3D object properties represent one or more objects tracked in association with at least one monitored person representative of behaviors of the at least one monitored person. Next, block 1110 illustrates predicting at least one type of behavior from the aggregated stream of 3D object properties from one or more behavior definitions that match the aggregated stream of 3D object properties with a percentage probability. Thereafter, block 1112 depicts transmitting each predicted type of behavior and other metadata, such as the percentage probability, mapped locations, user identifier, and time stamp, in a predicted behavior record to at least one behavior-enabled document control system, and the process ends.

With reference now to FIG. 12, a high level logic flowchart depicts a process and program for a 3D object detector performing behavior detection by tracking objects within image streams and other sensed data and generating 3D object properties for the tracked objects representative of behaviors. As illustrated, the process starts at block 1200 and thereafter proceeds to block 1202. Block 1202 depicts an object detector system receiving multiple image streams, via image capture devices, and sensed data, via one or more sensors. Next, block 1204 illustrates the object detector system attaching metadata to the image frames and sensed data, and the process passes to block 1206. In one example, metadata includes data such as, but not limited to, a camera identifier, frame number, timestamp, and pixel count.

Block 1206 depicts the object detector system processing each image stream and sensed data to detect and track objects, wherein objects may include physical objects and user movement indicative of a behavior. Next, block 1208 illustrates generating streams of tracked object properties with metadata from each image stream. Thereafter, block 1210 depicts combining the tracked object properties to generate 3D object properties with metadata. Next, block 1212 illustrates transmitting the 3D tracked object properties to a behavior interpreter system, and the process ends.

Referring now to FIG. 13, a high level logic flowchart depicts a process and program for a behavior interpreter system performing behavior prediction from tracked 3D object properties. In the example, the process starts at block 1300 and thereafter proceeds to block 1302. Block 1302 depicts a determination whether the behavior interpreter system receives 3D object properties. When the behavior interpreter system receives 3D object properties, then the process passes to block 1304. Block 1304 depicts accessing a range of applicable behavior definitions which trigger control of a document, and the process passes to block 1306.

Block 1306 illustrates the behavior interpreter system comparing the 3D object properties for tracked objects with the applicable behavior definitions. Next, block 1308 depicts the behavior interpreter system identifying at least one behavior definition with a closest match to one or more sets of 3D object properties. Thereafter, block 1310 illustrates calculating a percentage probability that the 3D object properties match the identified behavior definitions. Next, block 1312 depicts specifying at least one attribute of the identified behavioral signal type, including, but not limited to, a user identifier, an environment, an application, or a document. Next, block 1314 depicts transmitting the predicted behavior record with predicted behavior type, percentage probability, behavioral signal type attribute, time stamp, and other metadata, to one or more behavior enabled document control system, and the process ends.

With reference now to FIG. 14, a high level logic flowchart depicts a process and program for applying a predicted behavior record in a behavior-enabled document control system. As illustrated, the process starts at block 1400 and thereafter proceeds to block 1402. Block 1402 depicts a determination whether a behavior-enabled document control system receives a predicted behavior record. When the document control system receives a predicted behavior record, then the process passes to block 1404. Block 1404 illustrates accessing one or more entries within the behavior translation database applicable for the predicted behavior type, associated application, and other factors. Next, block 1406 depicts translating the predicted behavior record into one or more document control signals for one or more of directing insertion of a document element into a document and triggering an application function to be performed on a document. Thereafter, block 1408 illustrates controlling output of the document control signals to a selected application controller, and the process ends.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for controlling a document based on user behavior, comprising:

capturing a three-dimensional movement of a user, wherein the three-dimensional movement is determined using at least one image capture device aimed at the user;

identifying a three-dimensional object properties stream using the captured movement;

identifying at least one particular defined behavior of the user from the three-dimensional object properties stream by comparing the identified three-dimensional object properties stream with a plurality of behavior definitions each representing a separate behavioral signal which triggers control of the document;

selecting a position within the document to insert at least one document element based on at least one of a captured time stamp assigned to the captured three-dimensional object properties stream matching a document time stamp textually located within the document and a function performed by an application on the document triggered by the at least one particular defined behavior creating a position for inserting within the document;

creating at least one document element comprising at least one of a graphical element and a textual element to represent a translation of the at least one particular defined behavior into the at least one of the graphical element and the textual element by transcribing, by a transcript controller, a plurality of web conference streams comprising a plurality of timestamped entries received from a plurality of computer systems over a network for a plurality of participants in a web conference combined into the document comprising a real time transcript of the combined plurality of web conference streams;

receiving, by the transcript controller, from a particular computer system logged into by a particular participant of the plurality of participants, a document control signal comprising the at least one particular defined behavior and captured time stamp;

selecting, by the transcript controller, the position within the document to insert the at least one document element based on the captured time stamp in relation to the plurality of timestamps textually specified in the transcript comprising a plurality of ordered timestamp entries; and creating the at least one document element comprising a new entry in the transcript comprising a first textual element for the captured time stamp, a second textual element representing an identifier for the particular participant, and a third textual element translating the at least one particular defined behavior into text; and inserting the selected document element into the document at the position by inserting the new entry in the transcript at the position.

2. The method according to claim 1, wherein capturing a three-dimensional movement of the user further comprises capturing the three-dimensional movement using a stereoscopic image device to identify and track a particular three-dimensional movement of the user.

3. The method according to claim 1, wherein capturing a three-dimensional movement of the user further comprises capturing at least one image frame of a user at a first point in time and comparing at least one additional image frame from a second point in time with the image frame from the first point in time.

4. The method according to claim 1, wherein identifying at least one particular defined behavior representing a particular behavioral signal from the three-dimensional object properties stream further comprises calculating a percentage probability that the captured three-dimensional movement represents the at least one particular defined behavior.

5. The method according to claim 1, wherein creating at least one document element comprising at least one of a graphical element and a textual element to represent a translation of the at least one particular defined behavior into the at least one of the graphical element and the textual element further comprises:

translating the at least one particular defined behavior into at least one programming code element, programming code equation, and programming code module.

6. The method according to claim 1, further comprising:

identifying the at least one particular defined behavior of the user from the three-dimensional object properties stream specifying a behavior of the user physically pointing at another person in a physical environment with the user with at least one finger from the plurality of behavior definitions;

identifying the another person physically pointed to by the user by comparing a facial mapping of the another person within the three-dimensional object properties stream with a database of a plurality of facial mappings each assigned a separate user identification;

selecting a particular function of finding an electronic mail address for the another person pointed to by the user;

triggering an electronic mail application to perform the particular function to identify the electronic mail address for the person pointed to;

selecting the position within the document to insert the at least one document element within an address block of a document comprising an electronic mail from among a primary addressee position and a carbon copy addressee position based on a number of the at least one finger detected in the particular defined behavior;

creating the at least one document element comprising the textual element comprising the electronic mail address;

inserting the at least one document element into the electronic mail in the position.

7. A system for controlling a document based on user behavior, comprising:

a behavior processing system comprising a processor connected to a memory communicatively connected to a network, further comprising:

means for capturing a three-dimensional movement of a user, wherein the three-dimensional movement is determined using at least one image capture device aimed at the user;

means for identifying a three-dimensional object properties stream using the captured movement;

means for identifying at least one particular defined behavior of the user from the three-dimensional object properties stream by comparing the identified three-dimensional object properties stream with a plurality of behavior definitions each representing a separate behavioral signal which triggers control of the document; and a document control system comprising another processor connected to another memory communicatively connected to the behavior processing system via the network for selecting a position within the document to insert at least one document element based on at least one of a captured time stamp assigned to the captured three-dimensional object properties stream matching a document time stamp textually located within the document and a function performed by an application on the document triggered by the at least one particular defined behavior creating a position for inserting within the document;

the document control system comprising a transcript controller for creating at least one document element comprising at least one of a graphical element and a textual element to represent a translation of the at least one particular defined behavior into the at least one of the graphical element and the textual element by:

transcribing a plurality of web conference streams comprising a plurality of timestamped entries received from a plurality of computer systems over a network for a plurality of participants in a web conference combined into the document comprising a real time transcript of the combined plurality of web conference streams;

receiving from a particular computer system logged into by a particular participant of the plurality of participants, a document control signal comprising the at least one particular defined behavior and captured time stamp;

selecting the position within the document to insert the at least one document element based on the captured time stamp in relation to the plurality of timestamps textually specified in the transcript comprising a plurality of ordered timestamp entries; and creating the at least one document element comprising a new entry in the transcript comprising a first textual element for the captured time stamp, a second textual element representing an identifier for the particular participant, and a third textual element translating the at least one particular defined behavior into text; and the document control system for inserting the selected document element into the document at the position by inserting the new entry in the transcript at the position.

8. The system according to claim 7, wherein the means for capturing a three-dimensional movement of the user further comprises means for capturing the three-dimensional movement using a stereoscopic image device to identify and track a particular three-dimensional movement of the user.

9. The system according to claim 7, wherein the means for capturing a three-dimensional movement of the user further comprises means for capturing at least one image frame of a user at a first point in time and means for comparing at least one additional image frame from a second point in time with the image frame from the first point in time.

10. The system according to claim 7, wherein the means for identifying at least one particular defined behavior representing a particular behavioral signal from the three-dimensional object properties stream further comprises means for calculating a percentage probability that the captured three-dimensional movement represents the at least one particular defined behavior.

11. The system according to claim 7, the document control system further comprising:

means for selecting the at least one document element by translating the at least one particular defined behavior into at least one programming code element, programming code equation, and programming code module.

12. The system according to claim 7, the document control system further comprising:

means for identifying the at least one particular defined behavior of the user from the three-dimensional object properties stream specifying a behavior of the user physically pointing at another person in a physical environment with the user with at least one finger from the plurality of behavior definitions;

means for identifying the another person physically pointed to by the user by comparing a facial mapping of the another person within the three-dimensional object properties stream with a database of a plurality of facial mappings each assigned a separate user identification;

means for selecting a particular function of finding an electronic mail address for the another person pointed to by the user;

means for triggering an electronic mail application to perform the particular function to identify the electronic mail address for the person pointed to;

means for selecting the position within the document to insert the at least one document element within an address block of a document comprising an electronic mail from among a primary addressee position and a carbon copy addressee position based on a number of the at least one finger detected in the particular defined behavior;

means for creating the at least one document element comprising the textual element comprising the electronic mail address;

means for inserting the at least one document element into the electronic mail in the position.

13. A program product comprising a storage-type computer-usable medium including a computer-readable program for controlling a document based on user behavior, wherein the computer-readable program when executed on a computer cause the computer to:

capture a three-dimensional movement of a user, wherein the three-dimensional movement is determined using at least one image capture device aimed at the user;

identify a three-dimensional object properties stream using the captured movement;

identify at least one particular defined behavior of the user from the three-dimensional object properties stream by comparing the identified three-dimensional object properties stream with a plurality of behavior definitions each representing a separate behavioral signal which triggers control of the document;

select a position within the document to insert at least one document element based on at least one of a captured time stamp assigned to the captured three-dimensional object properties stream matching a document time stamp textually located within the document and a function performed by an application on the document triggered by the at least one particular defined behavior creating a position for inserting within the document;

create at least one document element comprising at least one of a graphical element and a textual element to represent a translation of the at least one particular defined behavior into the at least one of the graphical element and the textual element by:

transcribing a plurality of web conference streams comprising a plurality of timestamped entries received from a plurality of computer systems over a network for a plurality of participants in a web conference combined into the document comprising a real time transcript of the combined plurality of web conference streams;

receiving from a particular computer system logged into by a particular participant of the plurality of participants, a document control signal comprising the at least one particular defined behavior and captured time stamp;

selecting the position within the document to insert the at least one document element based on the captured time stamp in relation to the plurality of timestamps textually specified in the transcript comprising a plurality of ordered timestamp entries; and creating the at least one document element comprising a new entry in the transcript comprising a first textual element for the captured time stamp, a second textual element representing an identifier for the particular participant, and a third textual element translating the at least one particular defined behavior into text; and insert the selected document element into the document at the position by inserting the new entry in the transcript at the position.

14. The program product of claim 13, wherein said computer-readable program is transmitted over a network.

* * * * *